(12) United States Patent
Buma

(10) Patent No.: US 8,041,479 B2
(45) Date of Patent: Oct. 18, 2011

(54) VEHICLE SUSPENSION SYSTEM

(75) Inventor: Shuuichi Buma, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1091 days.

(21) Appl. No.: 11/843,298

(22) Filed: Aug. 22, 2007

(65) Prior Publication Data

US 2008/0054540 A1   Mar. 6, 2008

(30) Foreign Application Priority Data

Aug. 29, 2006   (JP) .................................. 2006-232284

(51) Int. Cl.
  *B60G 17/018*   (2006.01)
  *B60G 23/00*   (2006.01)
  *B62C 3/00*   (2006.01)
  *B62K 25/00*   (2006.01)
  *G06F 17/00*   (2006.01)
  *G06F 19/00*   (2011.01)

(52) U.S. Cl. ....... 701/37; 267/195; 180/902; 280/5.512; 280/5.515

(58) Field of Classification Search .................. 701/37; 267/195; 180/902; 280/5.512, 5.515
See application file for complete search history.

(56) References Cited

U.S. PATENT DOCUMENTS

| | | | | |
|---|---|---|---|---|
| 5,072,965 A * | 12/1991 | Wada et al. | ................ | 280/5.515 |
| 5,293,969 A * | 3/1994 | Yamaoka et al. | ......... | 188/266.5 |
| 5,444,621 A * | 8/1995 | Matsunaga et al. | ............ | 701/37 |
| 5,598,337 A * | 1/1997 | Butsuen et al. | ................ | 701/37 |
| 6,247,685 B1 * | 6/2001 | Takahashi | ................ | 267/140.15 |
| 6,425,585 B1 | 7/2002 | Schuelke et al. | | |
| 6,434,460 B1 * | 8/2002 | Uchino et al. | .................. | 701/37 |
| 7,005,816 B2 * | 2/2006 | Hio et al. | ....................... | 318/375 |
| 7,289,893 B2 * | 10/2007 | Gouriet et al. | ................. | 701/37 |
| 2002/0032508 A1 * | 3/2002 | Uchino et al. | .................. | 701/37 |
| 2003/0033063 A1 | 2/2003 | Kawashima et al. | | |
| 2004/0150361 A1 * | 8/2004 | Hio et al. | ....................... | 318/375 |
| 2006/0047387 A1 * | 3/2006 | Izawa et al. | ..................... | 701/37 |
| 2006/0082077 A1 * | 4/2006 | Gouriet et al. | ................. | 280/5.5 |
| 2006/0283675 A1 * | 12/2006 | Teraoka et al. | .............. | 188/298 |

FOREIGN PATENT DOCUMENTS

EP   1 623 856 A2   2/2006

(Continued)

*Primary Examiner* — Khoi Tran
*Assistant Examiner* — Jamie Figueroa
(74) *Attorney, Agent, or Firm* — Oblon, Spivak, McClelland, Maier & Neustadt, L.L.P.

(57) ABSTRACT

A suspension system including: (a) a suspension spring; (b) a shock absorber; and (c) a generator for generating a displacement force forcing sprung and unsprung members of a vehicle to be displaced toward or away from each other. The generator includes (c-1) an elastic body connected one of the sprung and unsprung members and (c-2) an actuator disposed between the elastic body and the other of the sprung and unsprung members. The actuator includes a motor, and is operable to generate an actuator force based on a motor force generated by the motor, such that the generated actuator force acts on the elastic body and such that the generated actuator force is transmitted to the sprung and unsprung members via the elastic body so as to act as the displacement force. The suspension system further includes (d) a controller for controlling operation of the motor so as to control the displacement force. The controller performs a damping-force control for controlling the displacement force as a damping force for damping vibration of the spring member and/or the unsprung members.

9 Claims, 14 Drawing Sheets

FOREIGN PATENT DOCUMENTS

| | | |
|---|---|---|
| JP | 63-270936 | 11/1988 |
| JP | 3-227714 | 10/1991 |
| JP | 4-27615 | 1/1992 |
| JP | 2002-211224 | 7/2002 |
| JP | 2002-218778 | 8/2002 |
| JP | 2003-11634 | 1/2003 |
| JP | 2003-54234 | 2/2003 |
| JP | 2006-44523 | 2/2006 |
| JP | 2006-82751 | 3/2006 |
| JP | 2006-219047 | 8/2006 |

* cited by examiner

FIG.7

| OPERATION MODE | MOTOR FORCE GENERATING DIRECTION | DETECTED SIGNALS OF HALL ELEMENTS | | | STATES OF SWITCHING ELEMENTS | | | | | |
|---|---|---|---|---|---|---|---|---|---|---|
| | | Ha | Hb | Hc | WLC | VLC | ULC | WHC | VHC | UHC |
| CONTROLLED-POWER SUPPLYING MODE | CCW DIRECTION | H | L | H | 0 | 0 | 1 * | 0 | 1 | 0 |
| | | H | L | L | 0 | 0 | 1 * | 1 | 0 | 0 |
| | | H | H | L | 0 | 1 * | 0 | 1 | 0 | 0 |
| | | L | H | L | 0 | 1 * | 0 | 0 | 0 | 1 |
| | | L | H | H | 1 * | 0 | 0 | 0 | 0 | 1 |
| | | L | L | H | 1 * | 0 | 0 | 0 | 1 | 0 |
| | CW DIRECTION | H | L | H | 0 | 1 * | 0 | 0 | 0 | 1 |
| | | H | L | L | 1 * | 0 | 0 | 0 | 0 | 1 |
| | | H | H | L | 1 * | 0 | 0 | 0 | 1 | 0 |
| | | L | H | L | 0 | 0 | 1 * | 0 | 1 | 0 |
| | | L | H | H | 0 | 0 | 1 * | 1 | 0 | 0 |
| | | L | L | H | 0 | 1 * | 0 | 1 | 0 | 0 |
| STAND BY MODE | CCW DIRECTION | H | L | H | 0 | 0 | 0 * | 0 | 1 | 0 |
| | | H | L | L | 0 | 0 | 0 * | 1 | 0 | 0 |
| | | H | H | L | 0 | 0 * | 0 | 1 | 0 | 0 |
| | | L | H | L | 0 | 0 * | 0 | 0 | 0 | 1 |
| | | L | H | H | 0 * | 0 | 0 | 0 | 0 | 1 |
| | | L | L | H | 0 * | 0 | 0 | 0 | 1 | 0 |
| | CW DIRECTION | H | L | H | 0 | 0 * | 0 | 0 | 0 | 1 |
| | | H | L | L | 0 * | 0 | 0 | 0 | 0 | 1 |
| | | H | H | L | 0 * | 0 | 0 | 0 | 1 | 0 |
| | | L | H | L | 0 | 0 | 0 * | 0 | 1 | 0 |
| | | L | H | H | 0 | 0 | 0 * | 1 | 0 | 0 |
| | | L | L | H | 0 | 0 * | 0 | 1 | 0 | 0 |
| BRAKING MODE | | | | | 0 | 0 | 0 | 1 | 1 | 1 |
| FREE MODE | | | | | 0 | 0 | 0 | 0 | 0 | 0 |

1 : ON STATE (CLOSED STATE)  
0 : OFF STATE (OPEN STATE)  
H : DETECTED STATE  
L : NON-DETECTED STATE

1 * : UNDER DUTY CONTROL BY PWM  
0 * : STATE IN WHICH PULSE-ON TIME IS 0 UNDER DUTY CONTROL BY PWM

US 8,041,479 B2

VEHICLE SUSPENSION SYSTEM

This application is based on Japanese Patent Application No. 2006-232284 filed on Aug. 29, 2006, the content of which is incorporated hereinto by reference.

BACKGROUND OF THE INVENTION

1. Field of the Invention

The present invention relates to a suspension system equipped with a displacement force generator that is configured to generate, by activating an electrically-operated actuator, a displacement force causing sprung and unsprung members of a vehicle to be displaced toward or away from each other, in a manner that enables the generated displacement force to be controllable.

2. Discussion of Related Art

In recent years, there have been begun studies on a vehicle suspension system as disclosed in JP-2002-218778A, JP-2002-211224A and JP-2006-82751A, specifically, a system including a displacement force generator which is provided in parallel with a suspension spring and a shock absorber. The displacement force generator is operable to generate, based on actuation of the electrically-operated actuator, a displacement force causing the sprung and unsprung members to be displaced toward or away from each other, in a manner that enables the generated displacement force to be controllable. In this system, the generated displacement force acts as a roll reduction force for reducing roll of a body of the vehicle. That is, in this system, the roll of the vehicle body can be reduced by the displacement force generated by the displacement force generator.

SUMMARY OF THE INVENTION

The above-described displacement force generator of the vehicle suspension system disclosed in each of the above-identified publications of Japanese Unexamined Patent Applications is controlled for reducing the roll of the vehicle body, so as to contribute to improvement in stability of attitude of the vehicle body. However, it is considered that, in such a suspension system equipped with the force generator, there is still room for improvement for increasing the utility.

The present invention was made in the light of the background art discussed above. It is therefore an object of the invention to provide a vehicle suspension system having a high serviceability in the practical use.

This object may be achieved according to the principle of this invention, which provides a vehicle suspension system including a suspension spring, a shock absorber and a displacement force generator that are disposed in parallel with one another, wherein the displacement force generator includes an elastic body and an electrically operated actuator which is disposed in series with the elastic body and which is operable to generate an actuator force, such that the generated actuator force is transmitted to sprung and unsprung members of a vehicle so as to act as the displacement force. The suspension system further includes a displacement force controller operable to control the displacement force generated by the displacement force generator, and to perform a control for generating the displacement force as a damping force for damping vibration of the sprung member and/or the unsprung member.

In the vehicle suspension system according to the present invention, the vibration damping force can be generated by the displacement force generator, in addition to a vibration damping force generated by the shock absorber. Therefore, the vehicle suspension system can be arranged to have a vibration damping characteristic suitable for a desired purpose, and accordingly can have a high serviceability in the practical use.

VARIOUS MODES OF THE INVENTION

There will be described various modes of the invention deemed to contain claimable features for which protection is sought. Each of these modes of the invention is numbered like the appended claims and depends from the other mode or modes, where appropriate, for easier understanding of the technical features disclosed in the present specification. It is to be understood that the present invention is not limited to the technical features or any combinations thereof which will be described, and shall be constructed in the light of the following descriptions of the various modes and preferred embodiments of the invention. It is to be further understood that a plurality of elements or features included in any one of the following modes of the invention are not necessarily provided all together, and that the invention may be embodied with selected at least one of the elements or features described with respect to the same mode. It is to be still further understood that a plurality of elements or features included in any one of the following modes of the invention may be combined with at least one additional element or feature in the light of the following descriptions of the various modes and the preferred embodiments of the invention, and that the invention may be embodied with such a possible combination with respect to the same mode.

(1) A suspension system for a vehicle, including: (a) a suspension spring disposed between sprung and unsprung members of the vehicle; (b) a shock absorber disposed in parallel with the suspension spring; and (c) a displacement force generator disposed in parallel with the suspension spring and operable to generate a displacement force forcing the sprung and unsprung members to be displaced toward or away from each other, wherein the displacement force generator includes (c-1) an elastic body connected at one of opposite end portions thereof to one of the sprung and unsprung members and (c-2) an electrically-operated actuator disposed between the other of the opposite end portions of the elastic body and the other of the sprung and unsprung members and interconnecting the elastic body and the other of the sprung and unsprung members, and wherein the electrically-operated actuator includes an electric motor, and is operable to generate an actuator force based on a motor force generated by the electric motor, such that the generated actuator force acts on the elastic body so as to change an amount of deformation of the elastic body that is dependent on an amount of actuation of the actuator and such that the generated actuator force is transmitted to the sprung and unsprung members via the elastic body so as to act as the displacement force, the suspension system further including: (d) a displacement force controller operable to control operation of the electric motor so as to control the displacement force that is to be generated by the displacement force generator.

In the suspension system according to this mode (1) which is conceptually illustrated in FIG. 1 by way of example, the suspension spring SS, the shock absorber SA and the elastic body TB are disposed between the sprung member Mu and the unsprung member Ml (that supports a wheel W), so as to be arranged in parallel with each other. The actuator A is disposed between the elastic body TB and one of the sprung and unsprung members Mu, Ml (i.e., the sprung member Mu in the example illustrated in FIG. 1), and interconnects the elastic body TB and the one of the sprung and unsprung members Mu, Ml. The actuator A is operable to generate the actuator force based on the motor force, such that the generated actuator force acts on the elastic body so as to cause deformation of the elastic body TB and such that the generated actuator force is transmitted to the sprung and unsprung members Mu, Ml via the elastic body TB so as to act as the displacement force (that causes the sprung and unsprung members Mu, Ml to be displaced toward or away from each other). That is, the displacement force generator D constituted by the actuator A and the elastic body TB is an electrically-operated actuator configured to generate the displacement force based on the motor force. The operation of the electric motor is controlled by the displacement force controller C, whereby the displacement force can be controlled.

The term "sprung member" described in this mode (1) may be broadly interpreted to mean a supported portion of a body of the vehicle that is supported by the suspension spring. Meanwhile, the term "unsprung member" may be broadly interpreted to mean a component of the vehicle that is vertically displaceable together with a suspension arm and a wheel of the vehicle. Further, the "suspension spring" may be provided by any one of various kinds of springs such as coil spring and air spring, and accordingly may have a construction that is not particularly limited.

The "shock absorber" has a function of generating a damping force for damping oscillation or vibration of the sprung and unsprung members relative to each other, and may have a construction that is not particularly limited. The shock absorber may be provided by, for example, any one of hydraulically operated shock absorbers that are commonly used in the art. The "elastic body" may be provided by any one of various forms of elastic bodies such as coil spring and torsion spring, as long as it is capable of exhibiting an elastic force that is dependent on an amount of its deformation. The "actuator" may be provided by an actuator that is arranged to be actuated in a manner suitable for form of the deformation of the elastic body. The "electric motor" may be provided by any type of motor such as a rotary motor or a linear motor, as long as it is suitable for actuation of the actuator. It is noted that the actuator may be equipped with a speed reducer.

The "displacement force generator" is configured to cause the actuator force to act on the elastic body so as to change the amount of deformation of the elastic body that is dependent on the amount of actuation of the actuator. The magnitude of the displacement force corresponds to the magnitude of the actuator force, which corresponds to the magnitude of the elastic force exhibited by the elastic body. The amount of actuation of the actuator corresponds to the amount of deformation of the elastic body. Thus, the magnitude of the displacement force (generated by the displacement force generator) and the amount of actuation of the actuator correspond to each other. Therefore, the control performed by the "displacement force controller" may be constituted by either an actuator force control or an actuator actuation amount control. In the actuator force control, the actuator force (i.e., the motor force of the electric motor for exhibiting the actuator force) is directly subjected to the control. In the actuation amount control, the amount of actuation of the actuator (i.e., the amount of motion of the electric motor for establishing the amount of actuation of the actuator) is directly subjected to the control. It is noted that the term "amount of actuation of the actuator" means the amount of the actuation of the actuator from a reference operating position of the actuator, which is established in a reference state in which the vehicle is stationary on a flat horizontal road, or in a state regarded as the reference state.

(2) The suspension system according to mode (1), wherein the elastic body includes (c-1-i) a shaft portion rotatably held by a body of the vehicle as the sprung member and (c-1-ii) an arm portion extending from one of opposite end portions of the shaft portion in a direction intersecting the shaft portion and connected at a distal end portion thereof to the unsprung member, and wherein the actuator is fixed to the vehicle body, and applies a rotational force as the actuator force, to the other of the opposite end portions of the shaft portion.

In the suspension system according to this mode (2), the elastic body of the displacement force generator includes the shaft portion and the arm portion, at least one of which has a function serving as the elastic body. For example, the shaft portion may serve as a torsion spring, and/or the arm portion may be arranged to be deflected so as to serve a spring. It is noted that the elastic body may be constituted by either an assembly of the shaft and arm portions provided by respective members that are connected to each other, or a single piece including the shaft and arm portions that are provided by a single member.

(3) The suspension system according to mode (1) or (2), wherein the actuator is configured to have a positive/negative efficiency product that is not larger than 1/2, where the positive/negative efficiency product is defined as a product of a positive efficiency of the actuator and a negative efficiency of the actuator, the positive efficiency is defined as a ratio of a magnitude of an external force acting on the actuator, to a magnitude of the motor force minimally required to cause the actuation of the actuator against the external force, and the negative efficiency is defined as a ratio of a magnitude of the motor force minimally required to inhibit the actuator from being actuated by an external force acting on the actuator, to a magnitude of the external force.

The "positive/negative efficiency product" described in this mode (3) may be considered as a ratio of a magnitude of the motor force minimally required to inhibit the actuator from being actuated by a certain magnitude of the external force acting on the actuator, to a magnitude of the motor force minimally required to cause the actuation of the actuator against the external force. Therefore, a low value of the positive/negative efficiency product indicates that the actuator is hard to be actuated by the external force. Where the positive/negative efficiency product of the actuator is relatively low, the electric motor requires a relatively small amount of electric power for maintaining a wheel-body distance (i.e., a vertical distance between the wheel and the vehicle body) under application of the external force to the actuator, for the purpose of reducing roll of the vehicle body and change of attitude of the vehicle body. It is therefore possible to provide a suspension system that is advantageous from a point of view of electric power saving, and also to reduce a size of the electric motor as a power source of the actuator. For sufficiently enjoying such advantages, it is preferable that the positive/negative efficiency product is not higher than 1/2.5, and more preferable that the product is not higher than 1/3.

(4) The suspension system according to any one of modes (1)-(3), wherein the actuator includes a speed reducer configured to decelerate motion of the electric motor, and is configured to output the decelerated motion as the actuation of the actuator, and wherein the speed reducer has a speed reduction ratio that is not higher than 1/100.

In the suspension system according to this mode (4), the speed reduction ratio of the speed reducer of the actuator is relatively low, namely, a ratio of an actuation amount of the actuator to a motion amount of the electric motor is relatively low. It can be considered that the above-described positive/negative efficiency product is, in general, reduced by employing the speed reducer having a low speed reduction ratio. In view of this, this mode (4) can be considered as a kind of the mode in which the actuator having a relatively low positive/negative efficiency product. When the actuator is actuated by application of the external force to the actuator, the electric motor is moved (e.g., rotated) at a speed that is higher where the speed reduction ratio is low than where the speed reduction ratio is high. Accordingly, where the speed reduction ratio is relatively low, a relatively large electromotive force is generated in the electric motor moved by the application of the external force, thereby making it possible to generate a relatively large electric power based on the electromagnetic force. It is therefore possible to provide a suspension system that is advantageous from a point of view of electric power saving, if the suspension system is arranged to be capable of recycling the regenerated electric power. For minimizing the positive/negative efficiency product and maximizing the advantage of the electric power saving, it is preferable that the speed reduction ratio is not higher than 1/150, and more preferable that the product is not higher than 1/200.

The speed reducer included in the actuator is not limited to any particular speed reducer, and may be constituted by any one of various speed reducers. However, the speed reducer is preferably constituted by a harmonic gear set (that is also called "harmonic drive" or "strain wave gearing") or a cycloid gear set, so that the speed reducer having a low speed reduction ratio can be easily constructed.

(5) The suspension system according to any one of modes (1)-(4), wherein the displacement force controller performs a damping-force control for controlling the displacement force as a damping force for damping vibration of at least one of the sprung and unsprung members.

In the suspension system according to this mode (5), it is possible to utilize, as the damping force, the displacement force generated by the displacement force generator, in addition to a damping force that is generated by the shock absorber for damping oscillation or vibration of the sprung and unsprung members relative to each other. This arrangement is effective to increase a degree of freedom in performing the damping-force control and accordingly to design the suspension system with a wider design concept. Therefore, the vehicle suspension system can be designed to establish a vibration damping characteristic suitable for a desired purpose. It is noted that the term "vibration of at least one of the sprung and unsprung members" is interpreted to encompass vibration of the sprung member, vibration of the unsprung member and vibrations of the sprung and unsprung members.

(6) The suspension system according to mode (5), wherein the displacement force controller performs the damping-force control for establishing a vibration damping characteristic suitable for damping the vibration of a frequency range including a resonance frequency of the sprung member.

(7) The suspension system according to mode (5) or (6), wherein the shock absorber is configured to have a damping coefficient that establishes a vibration damping characteristic suitable for damping vibration of a frequency range including a resonance frequency of the unsprung member.

In the above-described modes (6) and (7), there are specified performances that are to be respectively exhibited by the displacement force generator and the shock absorber. In the suspension system according to mode (6), the displacement force generator is controlled by the displacement force controller to generate the damping force for restraining transmission of vibration having a relatively low frequency, from the unsprung member to the sprung member. In the suspension system according to mode (7), the shock absorber is configured to generate the damping force for restraining transmission of vibration having a relatively high frequency, from the unsprung member to the sprung member.

The displacement force generator is configured to generate the damping force whose magnitude is changeable by controlling the operation of the actuator. However, there is a tendency that it is difficult to adapt the damping force (generated by the displacement force generator) to be effective for a high frequency vibration, and such a tendency is increased where the employed actuator has a low value of the positive/negative efficiency product. The vibration damping characteristic suitable for damping vibration of the frequency range including the resonance frequency of the sprung member can be established by the displacement force generator. Where the displacement force generator is arranged to damp the vibration of the low frequency range, the shock absorber can be arranged to damp exclusively the vibration of the high frequency range. This arrangement can be established by combining features of the above-described modes (6) and (7). In fact, it is extremely difficult to enable the vibration of a wide frequency range (i.e., the vibrations of the low and high frequency ranges) to be effectively damped by a single damping-force generator, because it is desirable that the damping coefficient is set to be relatively high in a case where the vibration of the low frequency should be damped while it is desirable that the damping coefficient is set to be relatively low in a case where the vibration of the high frequency should be damped. In an arrangement with the combination of the features of the modes (6) and (7), the vibration of the low frequency range including the resonance frequency of the sprung member is coped with by the displacement force generator while the vibration of the high frequency range including the resonance frequency of the unsprung member is coped with by the shock absorber, thereby making it possible to provide a suspension system exhibiting an excellent damping characteristic for effectively damping the vibration of a wide frequency range. It is noted that a low value of the damping coefficient of the shock absorber is effective to reduce fluctuation of a load applied to a contact portion of the wheel which is in contact with a road surface. In this respect, too, the feature of the mode (7) is advantageous.

(8) The suspension system according to any one of modes (5)-(7), wherein the damping-force control is performed for generating the displacement force as the damping force whose magnitude is dependent on an absolute velocity of the sprung member.

In the suspension system according to this mode (8), the damping-force control is performed based on a so-called skyhook theory. Since the displacement force generator can generate the damping force that is not dependent on a relative velocity of the sprung and unsprung members, by controlling operation of the actuator, it is possible to easily execute a damping-force control based on the skyhook theory. However, in the damping-force control based on the skyhook theory, since the vibration of the unsprung member is not coped with, it is desirable to adopt a suitable arrangement for coping with the fluctuation of the load applied to the contact portion of the wheel. To this purpose, the damping coefficient of the shock absorber may be tuned suitably for enabling the shock absorber to have a sufficient function for restraining the fluctuation of the load applied to the contact portion of the wheel.

(9) The suspension system according to any one of modes (5)-(8), wherein the displacement force controller determines a target magnitude of the displacement force that is to be generated by the displacement force generator, a target amount of an electric power that is to be supplied to the electric motor of the actuator of the displacement force generator, and wherein the displacement force controller performs the damping-force control based on the determined target amount of the electric power.

As described above, the damping-force control performed by the displacement force controller may be constituted by either the actuator force control (in which the actuator force is directly subjected to the control) or the actuator actuation amount control (in which the amount of actuation of the actuator is directly subjected to the control). In the suspension system according to this mode (9), the damping-force control is constituted by the actuator force control. In the present suspension system, the target amount of the supplied electric power is determined without feeding back an actual magnitude of the actuator force or an actual actuation amount of the actuator, namely, without account being taken of the actual output. That is, the damping-force control is executed by a feedforward control or open-loop control. Where the displacement force generator is controlled, as described below, by a closed-loop control such as PI control and PID control, it is not necessarily possible to obtain a satisfactory responsiveness, for example, due to presence of an integral term (I-term) component. However, a relatively high degree of responsiveness is required since the damping-force control has to be executed in a manner for generating the damping force whose magnitude is suitable for damping an object that is vibrated at a relative high velocity. In the present mode with account being taken of such a requirement, the damping-force control is executed by an open-loop control that provides a satisfactory responsiveness.

(10) The suspension system according to mode (9), wherein the displacement force controller performs the damping-force control, by allowing supply of the target amount of the electric power from an electric power source to the electric motor in process of increase in a target actuation amount defined as an amount of actuation of the actuator that corresponds to the target magnitude of the displacement force, while inhibiting supply of the electric power from the electric power source to the electric motor in process of reduction in the target actuation amount.

As described above, the displacement force generated by the displacement force generator is dependent on the amount of actuation of the actuator. The "process of increase in the target actuation amount" means a process of increase in the magnitude of the displacement force. The "process of reduction in the target actuation amount" means a process of reduction in the magnitude of the displacement force. In the process of increase in the target actuation amount, namely, in a stage in which the amount of deformation of the elastic body is to be increased, the supply of the electric power from the power source to the electric motor as a drive source is required since the amount of actuation of the actuator has to be increased against application of the external force such as an elastic force of the elastic body. On the other hand, in the process of reduction in the target actuation amount, namely, in a stage in which the amount of deformation of the elastic body is to be reduced, the supply of the electric power from the power source to the electric motor is not required since the amount of actuation of the actuator can be reduced by utilization of the external force such as a restoring force of the elastic body. In this mode (10) with account being taken of presence of the external force, e.g., the behavior of the elastic body, the supply of the electric power is suspended in the process of reduction in the target actuation amount whereby the damping-force control can be performed with a reduced consumption of the electric power.

(11) The suspension system according to mode (10), wherein the displacement force controller performs the damping-force control, by utilizing the actuator force based on an electromotive force that is generated in the electric motor in the process of reduction in the target actuation amount.

In the process of reduction in the target actuation amount, it is possible to cause the actuator force to act as a resistance to reduction in the actuation amount, by utilizing the electromotive force generated in the electric motor that is moved by application of the external force, without depending on supply of the electric power from the power source. Therefore, in the process of reduction in the target actuation amount, too, it is possible to generate a suitable magnitude of the damping force, by controlling the actuator force. Moreover, it is possible to further reduce consumption of the electric power, by recycling the regenerated electric power (that is generated by the electromotive force) to the power source. The damping-force control with utilization of the electromotive force is advantageous, particularly, where the actuator of the displacement force generator has a low value of the positive/negative efficiency product, or includes the speed reducer having a low speed reduction ratio.

(12) The suspension system according to mode (10) or (11), further comprising a drive circuit configured to drive the electric motor, wherein the displacement force controller performs the damping-force control, by causing the electric motor, in the process of reduction in the target actuation amount, to be operated under an operational mode which is dependent on an operational state of the drive circuit, and wherein the operational mode is one of (A) an motor-terminals interconnecting mode in which a plurality of motor terminals of the electric motor are electrically connected to each other, (B) a specific-motor-terminal/power-supply-terminal connecting mode in which one of a high-level voltage terminal and a low-level voltage terminal of the power source is electrically connected to a selected one of the plurality of motor terminals of the electric motor that is changed depending on an operating position of the electric motor, and (C) a motor-terminals disconnecting mode in which neither the high-level voltage terminal nor the low-level voltage terminal of the power source is electrically connected to the plurality of motor terminals of the electric motor and in which the plurality of motor terminals are electrically disconnected from each other.

The "operational mode", in which the electric motor is to be placed, is dependent on the operational state of the drive circuit, namely, is dependent on whether the terminals of the electric motor are electrically connected to or disconnected from each other and whether each of the terminals of the electric motor is electrically connected to or disconnected from each of the high-level voltage terminal and the low-level voltage terminal of the power source. Where the drive circuit is provided by an inverter, the operational state of the drive circuit is established by switching elements of the inverter each of which is operated to selectively connect and disconnect a corresponding one of the terminals respective phases of the electric motor to and from a corresponding one of the high-level and the low-level voltage terminals of the power source. Described specifically, when the electric power is to be supplied from the power source to the electric motor, the high-level and the low-level voltage terminals of the power source are electrically connected to selected two of the terminals of the electric motor, respectively, such that each of the selected two terminals is sequentially changed to another, depending on the operating position of the electric motor, for example. Further, PWM (Pulse Width Modulation) control may be performed on each switching element that interconnects one of the high-level and the low-level voltage terminals of the power source and one of the terminals of the electric motor, so that the amount of the supplied electric power can be changed by changing a duty ratio in the PWM control. Each of the three operational modes described in this mode (12) is an operational mode in which the electric power is not supplied to the electric motor from the power source. When the electric motor is moved by application of the external force, a characteristic of the electric motor, i.e., a characteristic of the electric motor with respect to the motor force varies depending on which one of the three operational modes is established.

In the "motor-terminals interconnecting mode", the plurality of terminals of the electric motor are electrically connected to each other, so that a relatively large magnitude of the electromotive force is generated in the electric motor when the electric motor is moved by application of the external force. Where the terminals are arranged to be shorted to each other in this motor-terminals interconnecting mode, the magnitude of the generated electromotive force can be maximized. In this motor-terminals interconnecting mode, the actuator force generated by the actuator acts as a relatively large resistance force against actuation caused the external force. The "motor-terminals disconnecting mode" is generally defined as an operational mode in which each phase of the electric motor is placed in its open state. In this motor-terminals disconnecting mode, the electromotive force is little generated (although the electromotive force can be generated depending on construction of the drive circuit), and accordingly the motor force is generated very little or by a relatively small magnitude, so that the actuator force generated by the actuator acts only as a relatively small resistance force against actuation caused by the external force. The "specific-motor-terminal/power-supply-terminal connecting mode" is defined as an operational state in which the duty ratio is set at 0 (zero) in the PWM control. In this operational state, some magnitude of the electromotive force is generated upon actuation of the actuator that is caused by the external force. The magnitude of the motor force generated in this instance is intermediate between that generated in the in the motor-terminals interconnecting mode and that generated in the motor-terminals disconnecting mode. Therefore, in this specific-motor-terminal/power-supply-terminal connecting mode, an intermediate magnitude of the actuator force is generated.

In the suspension system according to this mode (12), the electrical motor is operated in the process of reduction in the target actuation amount while one of the above-described three operational modes is established, so that the electric motor exhibits a characteristic depending on the established operational mode, and the actuator force dependent on the established operational mode acts as a resistance force against actuation of the actuation that is caused by the external force. It is noted that the suspension system according to this mode (12) does not necessarily have to be arranged such that all of the three operational modes are establishable, but may be arranged such that only one or two of the three operational modes are establishable. Where two or all of the three operational modes are establishable, one of the two or three operational modes may be selected according to at least one predetermined condition.

(13) The suspension system according to mode (12), wherein the displacement force controller performs the damping-force control, by causing the electric motor to be operated under the motor-terminals interconnecting mode in the process of reduction in the target actuation amount, when the target actuation amount is larger than a first threshold, and wherein the displacement force controller performs the damping-force control, by causing the electric motor to be operated under the motor-terminals disconnecting mode in the process of reduction in the target actuation amount, when the target actuation amount is not larger than a second threshold that is equal to or smaller than the first threshold.

As described above, the electrically-operated actuator of the displacement force generator generates the actuator force such that the generated actuator force acts on the elastic body so as to change the amount of deformation of the elastic body that is dependent on the amount of actuation of the actuator. Therefore, the elastic force generated by the elastic body is made larger where the target actuation amount of the actuator is relatively large, than where the target actuation amount of the actuator is relatively small. In view of this, in the suspension system according to this mode (13), the actuator is controlled to generate the resistance force in the process of reduction in the target actuation amount, namely, in a stage in which the actuator is actuated by the external force such as the restoring force of the elastic body, such that the generated resistance force is made relatively large where the target actuation amount of the actuator is relatively large, and such that the generated resistance force is made relatively small where the target actuation amount of the actuator is relatively small. It is therefore possible to suitably control the actuation of the actuator in the process of reduction in the target actuation amount in which the supply of the electric power from the electric power source to the electric motor is inhibited. It is noted that the above-described first threshold may be either equal to or larger than the above-described second threshold.

(14) The suspension system according to mode (13), wherein the second threshold is smaller than the first threshold, and wherein the displacement force controller performs the damping-force control, by causing the electric motor to be operated under the specific-motor-terminal/power-supply-terminal connecting mode in the process of reduction in the target actuation amount, when the target actuation amount is smaller than the first threshold and is larger than the second threshold.

When the specific-motor-terminal/power-supply-terminal connecting mode is employed as the operational mode, the magnitude of the actuator force generated by the actuator and acting as the resistance force against the external force is intermediate between that generated in the motor-terminals interconnecting mode and that generated in the motor-terminals disconnecting mode. Therefore, in the suspension system according to this mode (14), the intermediate magnitude of the actuator force acting as the resistance force is generated when the target actuation amount is intermediate, namely, is smaller than the first threshold and is larger than the second threshold, so that it is possible to further suitably control the actuation of the actuator in the process of reduction in the target actuation amount in which the supply of the electric power from the electric power source to the electric motor is inhibited.

(15) The suspension system according to any one of modes (1)-(14), wherein the displacement force controller performs a distance adjustment control for controlling the displacement force so as to adjust a distance between the sprung member and the unsprung member.

(16) The suspension system according to mode (15), wherein the distance adjustment control is performed so as to reduce at least one of roll and pitch of a body of the vehicle.

In the suspension system according to each of the modes (15) and (16), the displacement force controller performs the distance adjustment control in addition to the damping-force control. Since the distance between the sprung and unsprung members, i.e., a wheel-body distance is adjustable, it is possible to perform a roll-reduction control for reducing roll of the vehicle body, a pitch-reduction control for reducing pitch of the vehicle body, and a vehicle-height adjustment control for adjusting height of the vehicle.

(17) The suspension system according to mode (15) or (16), wherein the displacement force controller determines, based on a deviation of an actual amount of actuation of the actuator from a target amount of actuation of the actuator that corresponds to a desired amount of the distance between the sprung member and the unsprung member, a target amount of an electric power that is to be supplied to the electric motor of the actuator of the displacement force generator, such that the target amount of the electric power includes at least a first component based on the deviation and a second component based on an integral value of the deviation, and wherein the displacement force controller performs the distance adjustment control based on the determined target amount of the electric power.

In the suspension system according to this mode (17), the vehicle-height adjustment control is executed by a feedback control or closed-loop control based on the actuation amount of the actuator. In execution of the vehicle-height adjustment control, the displacement force generator is required to enable the above-described distance (between the sprung member and the unsprung member) to be maintained in a desired amount, under application of the external force such as roll moment, pitch moment and assigned component of vehicle weight. Therefore, even where the actual amount of the actuation is substantially equal to the target amount of the actuation, the actuator is required to keep generating the actuator force for maintaining the target actuation amount. Such a control required to maintain the target actuation amount is difficult to be executed by a feedforward control. In the present mode with account being taken of such a requirement, the vehicle-height adjustment control is executed by a so-called PI control or PID control. The above-described second component based on the integral value of the deviation, i.e., an integral term component (I-term component) can serve as a component of the target amount of the supplied electric power corresponding to the actuator force for maintaining the target actuation amount. Thus, in the suspension system according to this mode (17), the vehicle-height adjustment control can be easily performed in a suitable manner.

(18) The suspension system according to mode (17), wherein the displacement force controller performs the distance adjustment control, by allowing supply of the target amount of the electric power from an electric power source to the electric motor in process of increase in the target amount of actuation of the actuator, while allowing supply of a reduced amount of the electric power that is smaller than the target amount of the electric power, in process of reduction in the target amount of actuation of the actuator.

In the execution of the distance adjustment control, too, the amount of the electric power supplied to the electric motor has to be larger in the process of increase in the target actuation amount than in the process of reduction in the target actuation amount, in view of the above-described positive and negative efficiencies. In other words, in the process of reduction in the target actuation amount, the required amount of the supplied electric power may be reduced. Further, in the process of reduction in the target actuation amount, it is preferable that the amount of the supplied electric power is reduced for enabling the actuation of the actuator to smoothly follow the reduction in the target actuation amount. In the present mode with account being taken of this fact, it is possible to reduce the amount of the electric power consumed for the execution of the distance adjustment control and also to improve followability of the actuation of the actuator in the process of reduction in the target actuation amount. In the this mode (18), although not being explicitly described, it is possible to reduce the amount of the supplied electric power also in process of no change in the target actuation amount, namely, in a state in which the actual amount of the actuation of the actuation is substantially equal to the target actuation amount and the target actuation amount is not being changed. In this arrangement, the consumed amount of the electric power can be further reduced.

(19) The suspension system according to mode (18), wherein the reduced amount of the electric power is equal to the target amount of the electric power multiplied by a positive/negative efficiency product, where the positive/negative efficiency product is defined as a product of a positive efficiency of the actuator and a negative efficiency of the actuator, the positive efficiency is defined as a ratio of a magnitude of an external force acting on the actuator, to a magnitude of the motor force minimally required to cause the actuation of the actuator against the external force, and the negative efficiency is defined as a ratio of a magnitude of the motor force minimally required to inhibit the actuator from being actuated by the external force acting on the actuator, to a magnitude of the external force.

In view of the above-described relationship (based on the positive/negative efficiency product) between the external force and the actuator force, an appropriate ratio of the actuator force against a certain magnitude of the external force in the process of reduction in the target actuation amount to the actuator force against the same magnitude of the external force in the process of increase in the target actuation amount is accordance with the positive/negative efficiency product. In the present mode with account being taken of this relationship between the appropriate ratio and the positive/negative efficiency product, the actuator can be appropriately actuated with the supplied electric power being appropriately reduced.

(20) The suspension system according to any one of modes (1)-(4), wherein the displacement force controller performs a damping-force control for controlling the displacement force as a damping force for damping vibration of at least one of the sprung and unsprung members, and wherein the displacement force controller performs, concurrently with performance of the damping-force control, a distance adjustment control for controlling the displacement force so as to adjust a distance between the sprung and unsprung members.

(21) The suspension system according to mode (20), wherein the displacement force controller performs the damping-force control for establishing a vibration damping characteristic suitable for damping vibration of a frequency range including a resonance frequency of the sprung member.

(22) The suspension system according to mode (20) or (21), wherein the shock absorber is configured to have a damping coefficient that establishes a vibration damping characteristic suitable for damping vibration of a frequency range including a resonance frequency of the unsprung member.

(23) The suspension system according to any one of modes (20)-(22), wherein the damping-force control is performed for generating the displacement force as the damping force whose magnitude is dependent on an absolute velocity of the sprung member.

(24) The suspension system according to any one of modes (20)-(23), wherein the distance adjustment control is performed so as to reduce at least one of roll and pitch of a body of the vehicle.

In the suspension system according to each of modes (20)-(24), the damping-force control and the distance adjustment control are performed concurrently with each other. Owing to the concurrent performances of the controls, the suspension system has a remarkably high serviceability in the practical use. Detailed descriptions of the modes (20)-(24) are not provided herein, since they are substantially the same as the descriptions given above.

(25) The suspension system according to any one of modes (20)-(24), wherein the displacement force controller determines a damping-force-directed component, based on a magnitude of the displacement force that is to be generated in performance of the damping-force control, wherein the displacement force controller determines a distance-adjustment-directed component, based on a deviation of an actual amount of actuation of the actuator from a target amount of actuation of the actuator, such that the determined distance-adjustment-directed component includes a first component based on the deviation and a second component based on an integral value of the deviation, and wherein the damping-force control and the distance adjustment control are performed by the displacement force controller, concurrently with each other, based on a sum of the determined damping-force-directed and distance-adjustment-directed components that is a target amount of an electric power that is to be supplied to the electric motor, where the damping-force-directed component is defined as a component of the target amount of the electric power that is directed to performance of the damping-force control, while the distance-adjustment-directed component is defined as a component of the target amount of the electric power that is directed to performance of the distance adjustment control, and the target amount of actuation of the actuator is defined as a sum of (i) a damping-force-correspondent component corresponding to a magnitude of the displacement force that is to be generated in performance of the damping-force control and (ii) a distance-adjustment-correspondent component corresponding to a distance between the sprung and unsprung members that is to be established in performance of the distance adjustment control.

In the suspension system according to this mode (25), the actuator of the displacement force generator is controlled as described in the mode (25) during the concurrent performances of the damping-force and distance adjustment controls. As described above, it is demanded that the actuator is controlled by an open-loop control in performance of the damping-force control, and it is demanded that the actuator is controlled by a feedback control in performance of the distance adjustment control. In the present suspension system, the damping-force and distance adjustment controls can be performed in a unified manner with the above demands being met.

(26) The suspension system according to mode (25), wherein the displacement force controller performs the damping-force control and the distance adjustment control concurrently with each other, by allowing supply of the target amount of the electric power from an electric power source to the electric motor in process of increase in the target amount of actuation of the actuator, while allowing supply of a reduced amount of the electric power that is smaller than the target amount of the electric power, in process of reduction in the target amount of actuation of the actuator.

(27) The suspension system according to mode (26), wherein the reduced amount of the electric power is equal to the target amount of the electric power multiplied by a positive/negative efficiency product, where the positive/negative efficiency product is defined as a product of a positive efficiency of the actuator and a negative efficiency of the actuator, the positive efficiency is defined as a ratio of a magnitude of an external force acting on the actuator, to a magnitude of the motor force minimally required to cause the actuation of the actuator against the external force, and the negative efficiency is defined as a ratio of a magnitude of the motor force minimally required to inhibit the actuator from being actuated by an external force acting on the actuator, to a magnitude of the external force.

Each of the modes (26) and (27) defines an arrangement with respect to the reduction in the supplied electric power in the process of reduction in the target amount of actuation of the actuator during the concurrent performances of the damping-force and distance adjustment controls. Since the actuator is required to generate the actuator force for maintaining the distance-adjustment-correspondent component of the target amount of actuation in the case of the concurrent performances of the damping-force and distance adjustment controls, the amount of the supplied electric power is reduced in the process of reduction in the target amount of actuation, as in a case of performance of only the distance adjustment control. Detailed descriptions of the modes (26) and (27) are not provided herein, since they are substantially the same as the descriptions given above.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which:

FIG. 7 is a table showing operational states of respective switching elements of the inverter in each operational mode of the electric motor;

DETAILED DESCRIPTION OF THE PREFERRED EMBODIMENTS

There will be described an embodiment of the present invention, by reference to the accompanying drawings. It is to be understood that the present invention is not limited to the embodiment, and may be otherwise embodied with various changes and modifications, such as those described in the foregoing "VARIOUS MODES OF THE INVENTION", which may occur to those skilled in the art.

[Construction of Vehicle Suspension System]

Figure 1:
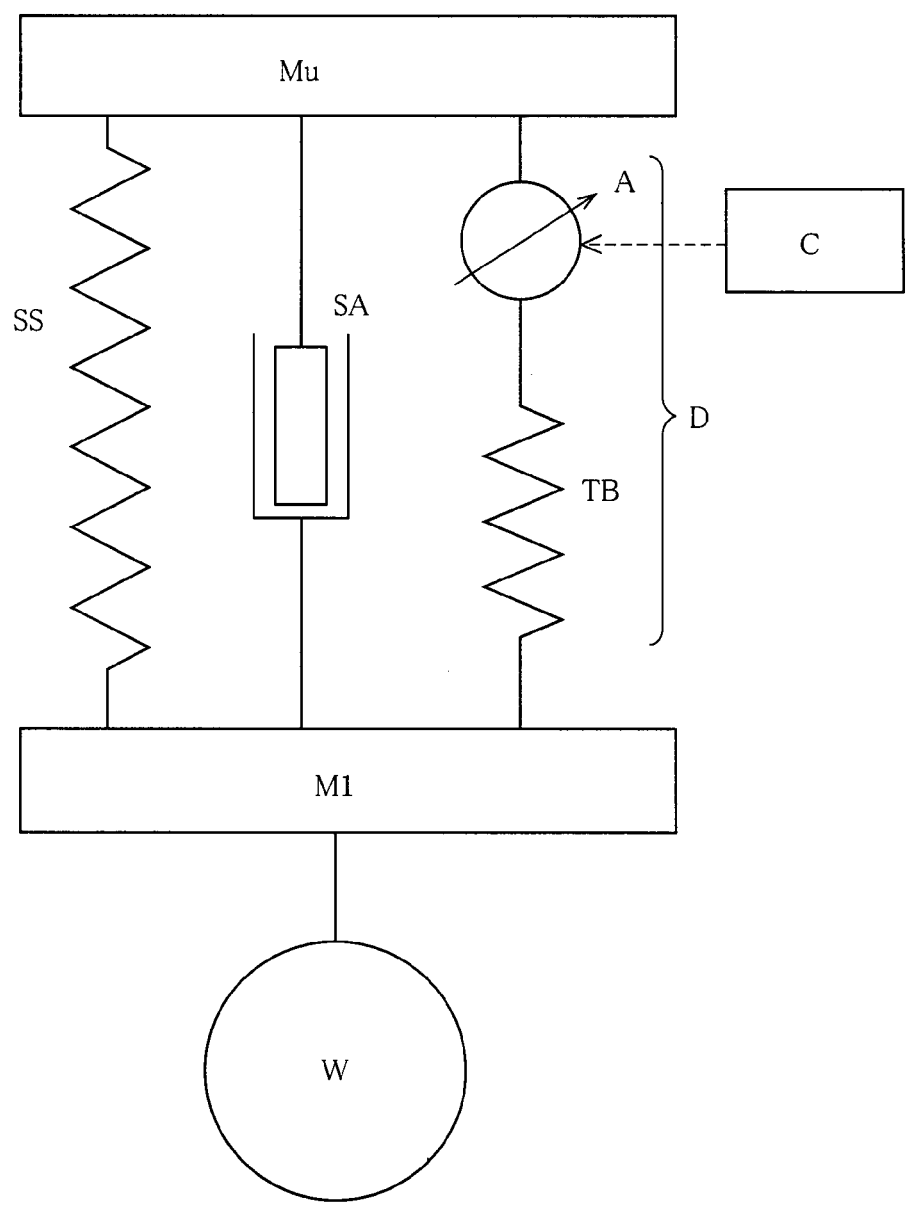
FIG. 1 is a view showing a concept of the present invention.
Figure 2:
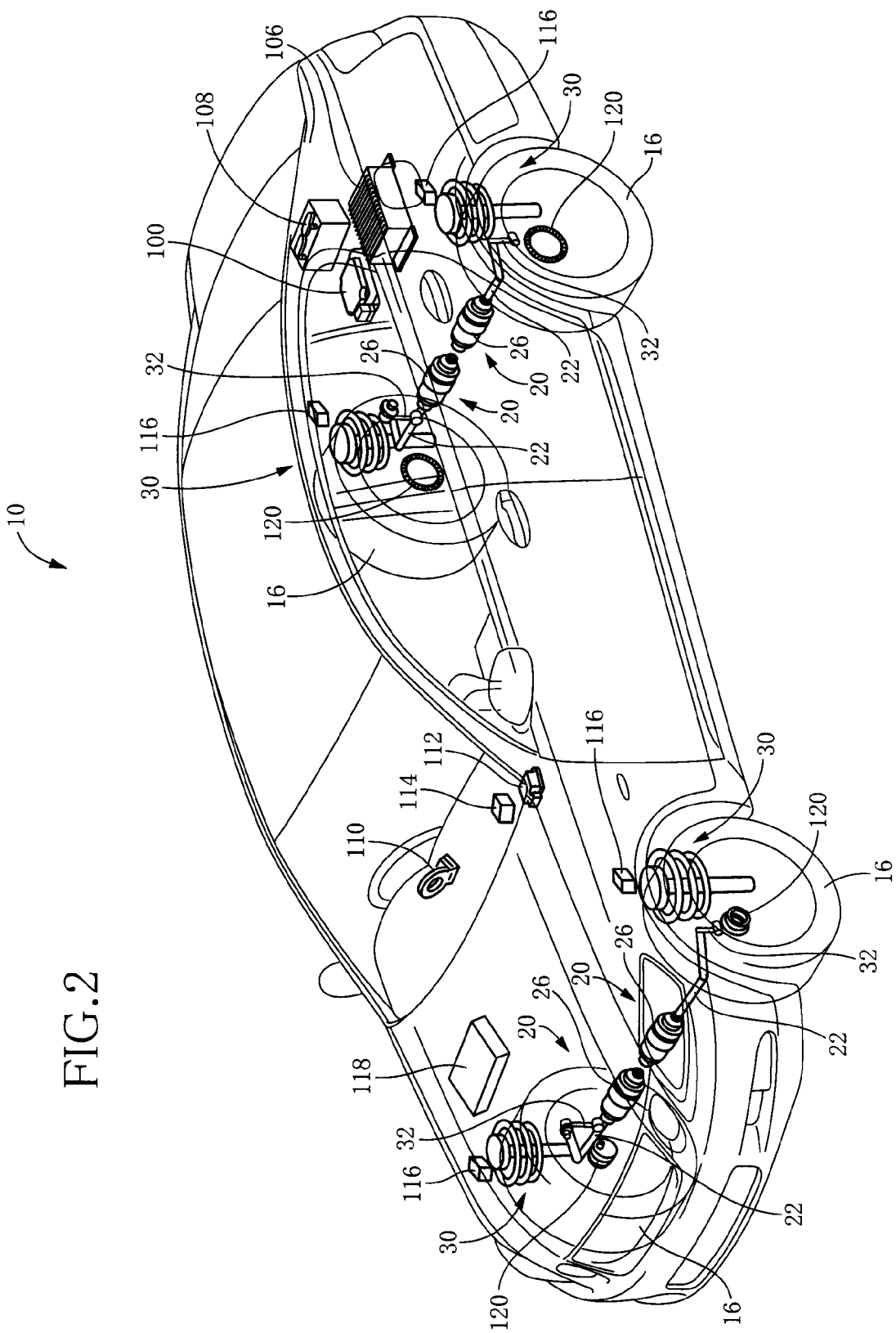
FIG. 2 is a view schematically showing an overall construction of a suspension system according to an embodiment of the invention.

FIG. 2 schematically shows a vehicle suspension system 10, which includes four wheel-body distance adjuster devices 20 provided for respective four wheels 16 of a vehicle (in which the suspension system 10 is installed). Each of the adjuster device 20 includes a generally letter L-shaped bar 22 and an actuator 26 operable to rotate the L-shaped bar 22. One of opposite end portions of the L-shaped bar 22 is connected to a corresponding one of four suspension devices 30 (that are provided for the respective four wheels 16) via a link rod 32, while the other of the opposite end portions of the bar 22 is connected to the actuator 26.

Each of the suspension devices 30 provided for a front wheel 16 as a steered wheel is equipped with a mechanism for allowing the wheel 16 to be steered, while each of the suspension devices 30 provided for a rear wheel 16 as a non-steered wheel is not equipped with such a steering mechanism. However, since all the suspension devices 30 can be regarded to be identical in construction with one another for presence or absence of the steering mechanism, there will be described, as a representative of the four suspension devices 30, one of the suspension devices 30 that is provided for the rear wheel 16, in the interest of simplification of the description. Each suspension device 30 of independent type is provided by a multi-link suspension, and is equipped with an arm assembly that includes a total of five suspension arms, i.e., a first upper arm 40, a second upper arm 42, a first lower arm 44, a second lower arm 46 and a toe control arm 48. Each of the five suspension arms 40, 42, 44, 46, 48 is connected at one of its longitudinal end portions to a body of the vehicle, pivotably relative to the vehicle body, and is connected at the other longitudinal end portion to an axle carrier 50. Owing to its connection with the five suspension arms 40, 42, 44, 46, 48, the axle carrier 50 is vertically displaceable relative to the vehicle body along a constant locus.

Figure 3:
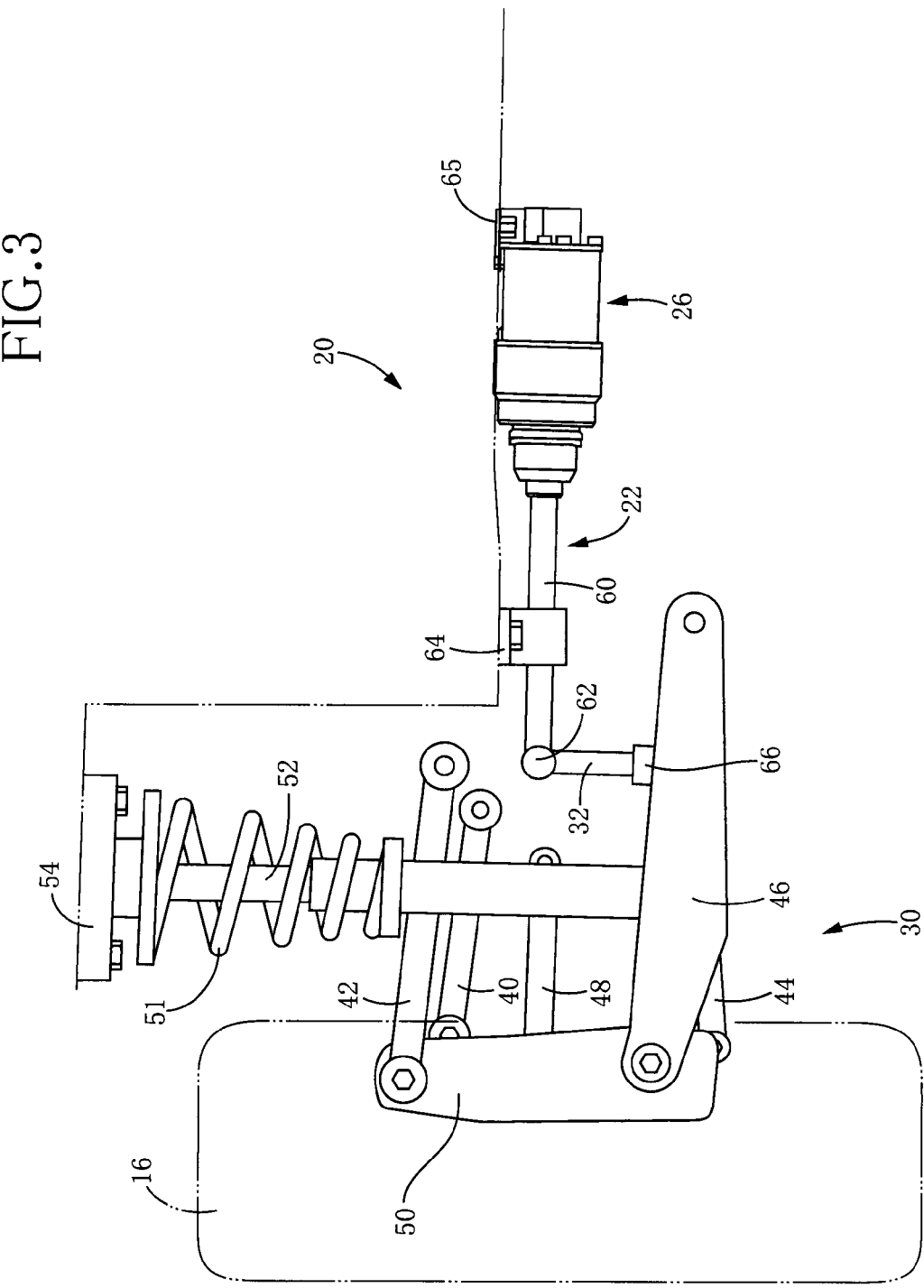
FIG. 3 is a view of a wheel-body distance adjuster device, a coil spring and a shock absorber that are included in the suspension system of FIG. 2, as seen from a rear side of the vehicle.

Each suspension device 30 includes a coil spring 51 (suspension spring) and a shock absorber 52 that constitute the suspension system 10, as shown in FIG. 3. The coil spring 51 and the shock absorber 52 are disposed in parallel with each other between a mount portion 54 and the above-described second lower arm 46. The mount portion 54 is disposed in a tire housing which is a part of the vehicle body and which corresponds to a sprung member. The second lower arm 46 corresponds to an unsprung member. The shock absorber 52 is of hydraulically-operated type, and is configured to damp relative oscillation or vibration of the sprung and unsprung members. The shock absorber 52 generates a damping force whose magnitude is determined uniquely based on a velocity of the relative vibration of the sprung and unsprung members. That is, a damping coefficient of the shock absorber 52 is fixed. Described specifically, the damping coefficient of the shock absorber 52 has a fixed value that is suitable for restraining transmission of vibration of a frequency range including a resonance frequency of the unsprung member, from the second lower arm 46 to the vehicle body, and for restraining fluctuation of a load applied to a contact portion of the wheel 16 which is in contact with a road surface. It is noted that the shock absorber 52 has a known construction which is not described herein.

Figure 4:
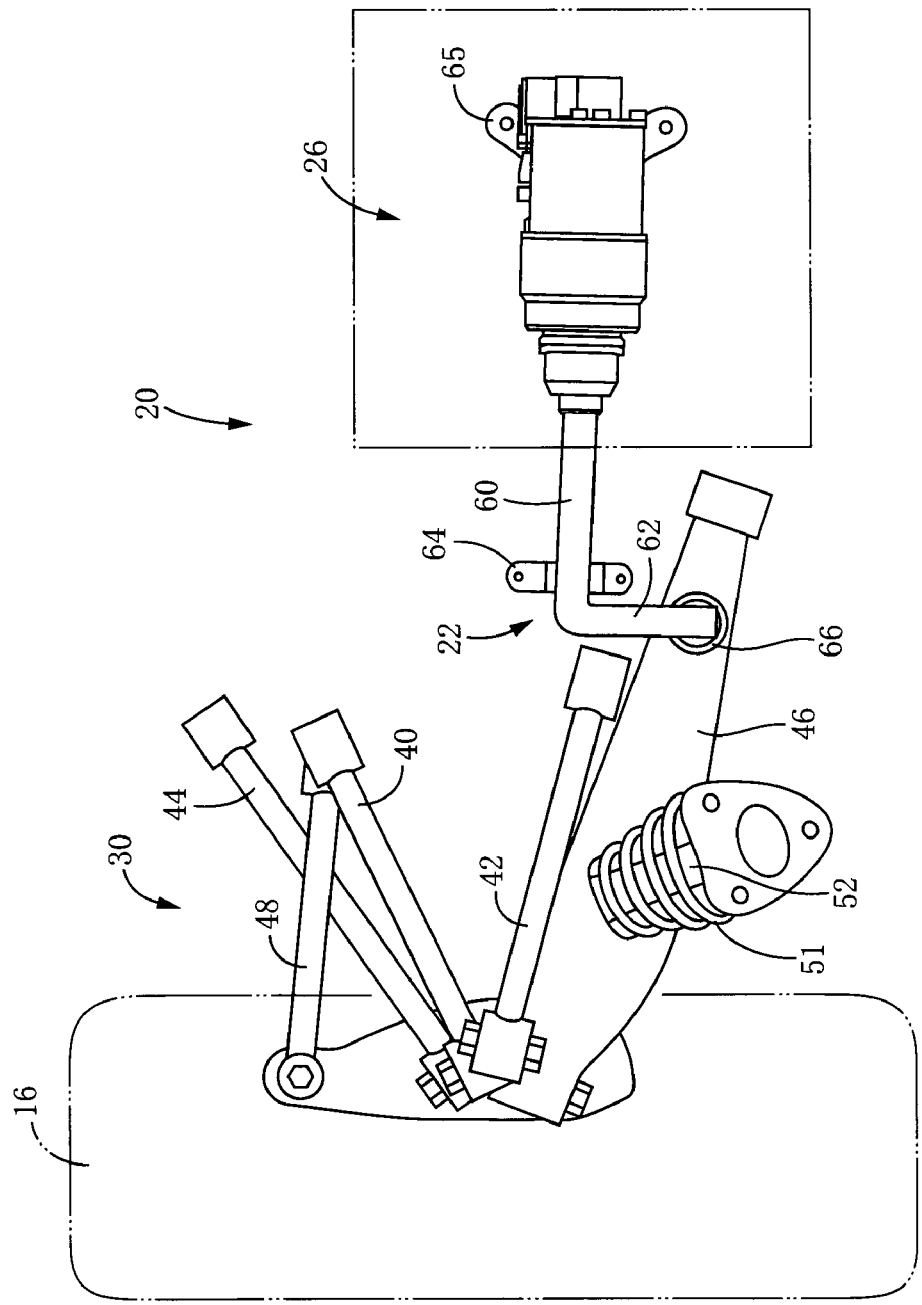
FIG. 4 is a view of the wheel-body distance adjuster device, the coil spring and the shock absorber that are included in the suspension system of FIG. 2, as seen from an upper side of the vehicle.

As shown in FIGS. 3 and 4, the L-shaped bar 22 of the adjuster device 20 includes a shaft portion 60 which extends substantially in a width or lateral direction of the vehicle, and an arm portion 62 which is contiguous to the shaft portion 60 and which extends in a direction not parallel to the shaft portion 60, e.g., substantially in a rearward direction of the vehicle. The shaft portion 60 of the L-shaped bar 22 is rotatably held, at its portion that is close to the arm portion 62, by a retainer 64 that is fixed to the vehicle body. The actuator 26 is fixed through an attachment 65 (that is provided in an end portion of the actuator 26) to a widthwise central portion of the vehicle body. The shaft portion 60 is connected at one of its longitudinal end portions (that is located an inner side of the other of the longitudinal end portions in the width direction of the vehicle) to the actuator 26. Meanwhile, the arm portion 62 is connected at one of its longitudinal end portions (that is remote from the shaft portion 60) to the second lower arm 46 via the link rod 32. A link-rod connection portion 66 is provided on the second lower arm 46 of the suspension device 30, so that the link rod 32 is rockably connected at its longitudinally opposite end portions to the link-rod connection portion 66 and the arm portion 62 of the L-shaped bar 22, respectively.

Figure 5:
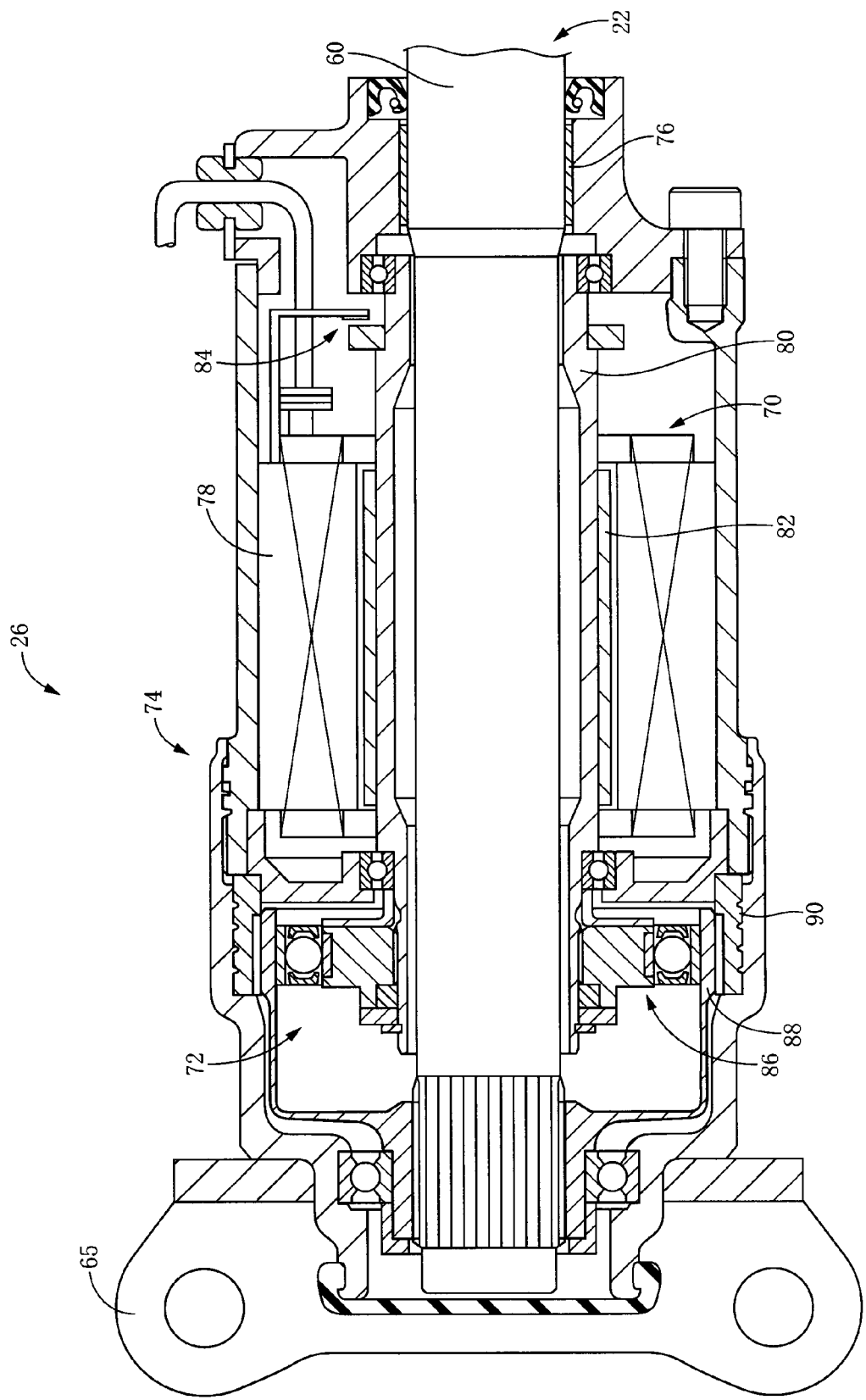
FIG. 5 is a view, partially in cross section, showing an actuator as a component of the wheel-body distance adjuster device that is included in the suspension system of FIG. 2.

As shown in FIG. 5, the actuator 26 of the adjuster device 20 includes an electric motor 70 as a drive source, and a speed reducer 72 arranged to reduce a rotational speed of the electric motor 70 while outputting a torque or rotational force of the electric motor 70. The electric motor 70 and the speed reducer 72 are disposed within a housing 74 as an outer shell member of the actuator 26. The housing 74 is fixedly attached to the vehicle body through the above-described attachment member 65 that is fixed to an end portion of the housing 74. The L-shaped bar 22 is arranged to extend throughout the housing 74 and project out from another end portion of the housing 74. The L-shaped bar 22 is connected, at its portion that is located within the housing 74, to the speed reducer 72. A bearing bushing 76 is provided to support an axially intermediate portion of the shaft portion 60 of the L-shaped bar 22, so that the shaft 24 is rotatably held by the housing 86 through the bearing bushing 76.

As shown in FIG. 5, the electric motor 70 includes a plurality of coils 78 that are fixedly disposed on a circumference along an inner surface of a circumferential wall of the housing 74, a motor shaft 80 that is provided by a hollow member rotatably held by the housing 74, and a permanent magnet 82 which is fixed to an outer circumferential surface of the motor shaft 80 and which is radially opposed to the coils 78. The electric motor 70 is provided by a three-phase DC brushless motor, so that each of the coils 78 serves as a stator while the permanent magnet 82 serves as a rotor. An angular position sensor 84 is provided in the housing 74, so as to detect an angular position of the motor shaft 80, i.e., an angular position (operating position) of the electric motor 70. The angular position sensor 84 is constituted principally by a rotary encoder, and outputs a signal that is used in controlling the actuator 26, namely, controlling the adjuster device 20.

The speed reducer 72 is provided by a harmonic gear set (which is also called "harmonic drive (trademark)" or "strain wave gearing"), and includes a wave generator 86, a flexible gear (flexspline) 88 and a ring gear (circular spline) 90. The wave generator 86 includes an elliptic cam and a ball bearing fitted on an outer circumferential surface of the elliptic cam, and is fixed to an end portion of the motor shaft 80. The flexible gear 88 is provided by a cup-shaped member having a circumferential wall portion that is elastically deformable, and a plurality of teeth (e.g., a total of 400 teeth in the present embodiment) formed on its outer circumferential surface. The teeth are located in one of axially opposite end portions of the flexible gear 88 that is close to an opening end of the cup-shaped flexible gear 88. The flexible gear 88 is connected to a gear connection portion of the shaft portion 60 of the L-shaped bar 22, so as to be held by the shaft portion 20. Described more specifically, the shaft portion 60 of the L-shaped bar 22 is arranged to extend throughout the motor shaft 80 provided by the hollow member. The above-described gear connection portion of the shaft portion 60 projects out from the motor shaft 80, and extends through a hole formed through a bottom wall of the cup-shaped flexible gear 88. The gear connection portion of the shaft portion 60 is serrated on its outer circumferential surface so as to be held in engagement with an inner circumferential surface of the hole formed through the bottom wall of the cup-shaped flexible gear 88 that is also serrated. Owing to the serration engagement, the shaft portion 70 and the flexible gear 88 are connected to each other, and are unrotatable relative to each other. The ring gear 90 is provided by a ring member fixed to the housing 74, and has a plurality of teeth (e.g., a total of 402 teeth in the present embodiment) formed on its inner circumferential surface. The flexible gear 88 is fitted at its circumferential wall portion on the wave generator 86, and is elastically deformed to have an elliptic shape. The flexible gear 88 meshes, at two portions thereof that lie substantially on a long axis of the elliptic shape, with the ring gear 90, while not meshing at the other portions thereof with the ring gear 90. In the thus constructed speed reducer 72, while the wave generator 86 is rotated by a single rotation (by 360°), namely, while the motor shaft 80 of the electric motor 70 is rotated by a single rotation, the flexible gear 88 and the ring gear 90 are rotated relative to each other by an amount corresponding to two teeth, i.e., a difference therebetween with respect to the number of teeth, so that the speed reducer 72 has a speed reduction ratio of 1/200.

When the electric motor 70 is driven, the L-shaped bar 22 is rotated by a motor force that is generated by the motor 70, whereby the shaft portion 60 of the L-shaped bar 22 is twisted. As a result of the twisting deformation or torsion of the shaft portion 60, a reaction is generated and then transmitted to the second lower arm 46 via the arm portion 62, link rod 32 and link-rod connection portion 66. This reaction acts as a displacement force forcing upwardly or downwardly a distal end portion of the second lower arm 46 toward or away from the vehicle body, namely, forcing the wheel 12 and the vehicle body toward each other or away from each other. That is, an actuator force, which is a force generated by the actuator 26, acts as the displacement force through the L-shaped bar 22 serving as an elastic body. In this respect, the adjuster device 20 can be considered to have a function serving as a displacement force generator that is operable to generate the displacement force. By adjusting a magnitude of the displacement force, it is possible to adjust a vertical distance between the vehicle body and the wheel, i.e., a distance between the sprung and unsprung members.

In the present suspension system 10, as shown in FIG. 2, an adjuster electronic control unit (adjuster ECU) 100 is provided for controlling the four adjuster devices 20. Described specifically, the adjuster ECU 100 is operable to control operations of the actuators 26 of the respective adjuster devices 20, and includes four inverters 102 serving as drive circuits for the electric motors 70 of the respective actuators 26 and a controller 104 (see FIG. 13) that is constituted principally by a computer including CPU, ROM and RAM. The inverters 102 are connected to a buttery 108 via a converter 106, which is provided by a bilateral converter that allows an electric current to pass therethrough in bilateral directions. The converter 106 is capable of increasing voltage of an electric power that is supplied from the buttery 108 so that the electric power is supplied from the buttery 108 to the electric motors 70 via the respective inverters 102. Further, the converter 106 is capable of reducing the voltage of the electric power so that the electric power is returned to the buttery 108 from the electric motors 70. Since each of the electric motors 70 is driven by a constant voltage, an amount of the electric power supplied to each electric motor 70 is changed by changing an amount of electric current supplied to each electric motor 70. That is, the motor force generated by each electric motor 70 is dependent on the amount of the supplied electric current, which can be changed, for example, by a PWM (pulse width modulation) control performed by the corresponding inverter 102. In the PWM control, each inverter 102 is arranged to suitably control a duty ratio, i.e., a ratio of pulse ON time to a sum of the pulse ON time and pulse OFF time.

Figure 13:
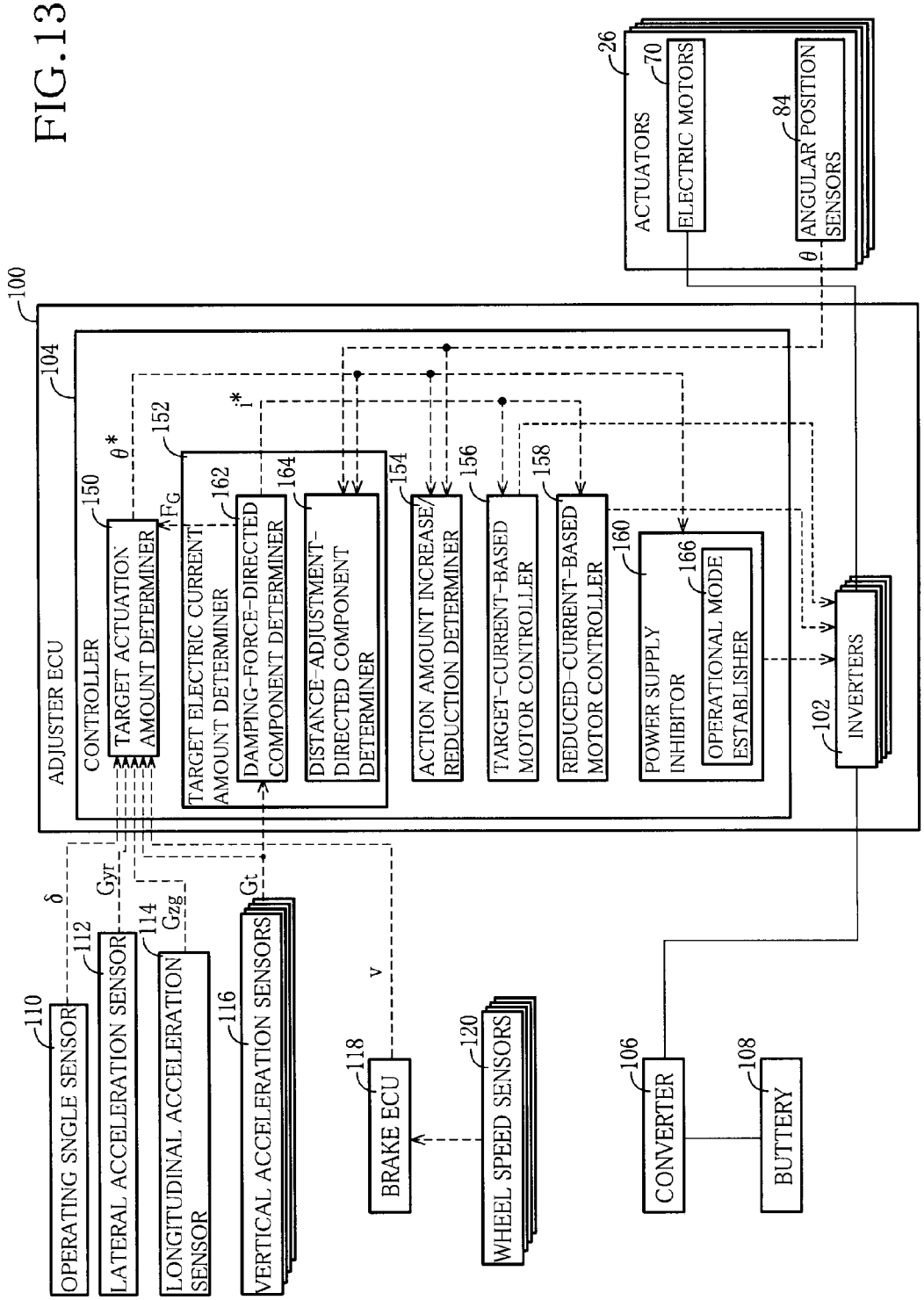
FIG. 13 is a block diagram showing various functional portions of a controller for controlling the suspension system of FIG. 2.

To the controller 104, there are connected an operating angle sensor 110, a lateral acceleration sensor 112, a longitudinal acceleration sensor 114, a vertical acceleration sensor 116 and a brake electronic control unit (brake ECU) 118 in addition to the above-described angular position sensors 84, as shown in FIG. 13. The operating angle sensor 110 is arranged to detect an operating angle of a steering wheel as a steering operating member, i.e., an operating amount (as a kind of a steering amount) of the steering wheel. The lateral acceleration sensor 112 is arranged to detect an actual acceleration of the vehicle body as measured in the lateral direction of the vehicle. The longitudinal acceleration sensor 114 is arranged to detect the actual acceleration of the vehicle body as measured in the longitudinal direction of the vehicle. The vertical acceleration sensor 116 is provided in the mount portion 154 of the vehicle body, and is arranged to detect the actual acceleration of the vehicle body as measured in the vertical direction of the vehicle. To the brake ECU 118 as a controller of a brake system of the vehicle, there are connected four wheel speed sensors 120 each of which is provided to detect a rotational speed of a corresponding one of the four wheels 16, so that the brake ECU 118 has a function of estimating a running speed of the vehicle based on the values detected by the four wheel speed sensors 120. The controller 104 is connected to the brake ECU 118, so as to obtain an estimated value of the running speed from the brake ECU 118, as needed. Further, the controller 104 is connected to the inverter 102, so as to control the adjuster device 20 by controlling the inverter 102. It is noted that the ROM included in the computer of the controller 104 stores therein programs and various data used for controlling the adjuster device 20.

[Operational Modes of Electric Motor]

Figure 6:
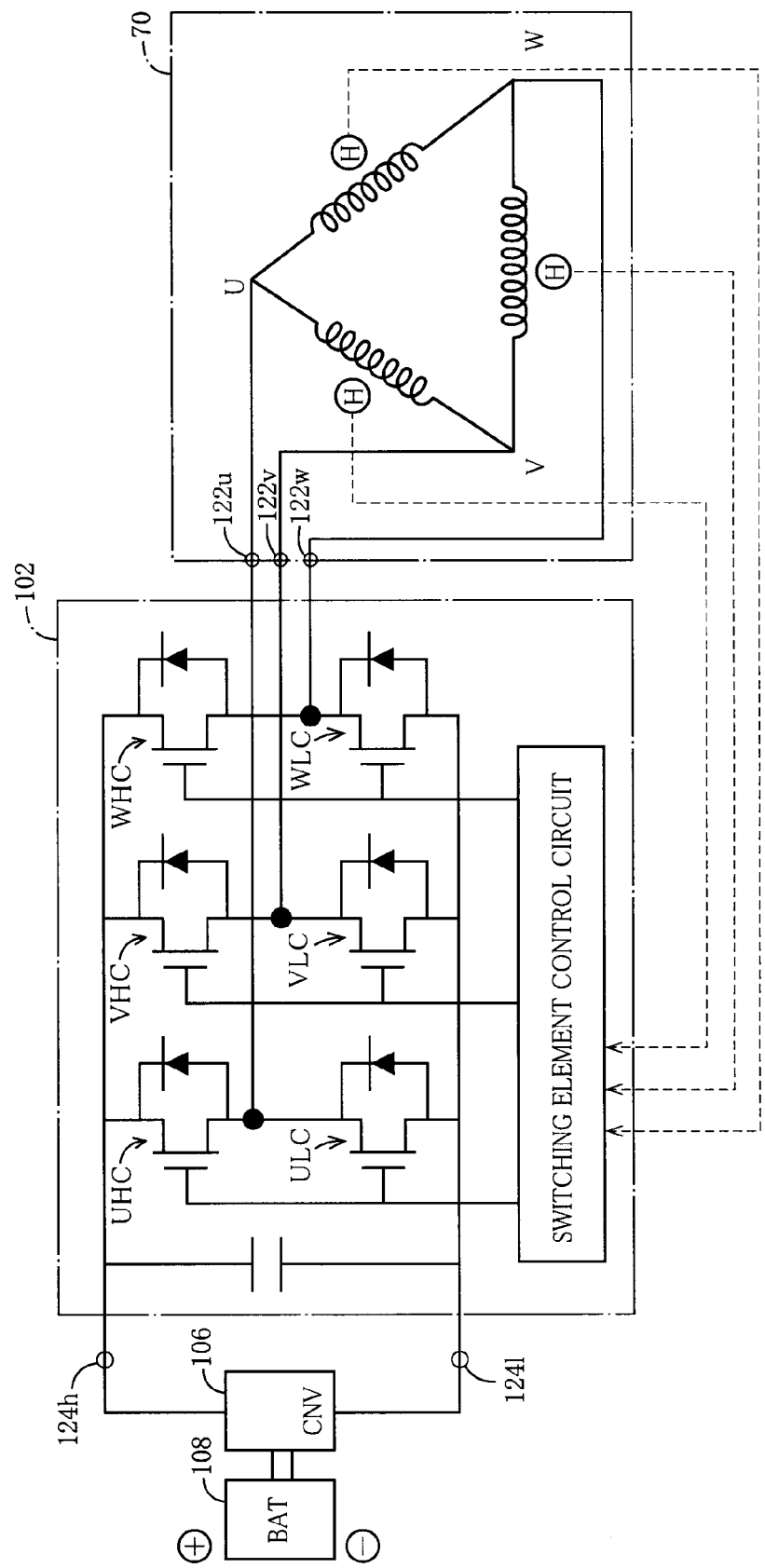
FIG. 6 is a circuit diagram showing an inverter which is included in the suspension system of FIG. 2 and which is connected to an electric motor of the actuator of FIG. 5.

As shown in FIG. 6, the electric motor 70 is a delta-connected three-phase DC brushless motor, and has terminals 122u, 122v, 122w that correspond to respective phases (U, V, W). The inverter 102 has a total of six switching elements UHC, ULC, VHC, VLC, WHC, WLC that are disposed between the electric motor 70 and the power source (that is provided by the buttery 108 and the converter 106). The switching element UHC is disposed between a high-level voltage terminal 124h of the power source and the terminal 122u, such that the high-level voltage terminal 124h and the terminal 122u are selectively connected to and disconnected from each other by operation of the switching element UHC. The switching element ULC is disposed between a low-level voltage terminal 124l of the power source and the terminal 122u, such that the low-level voltage terminal 124l and the terminal 122u are selectively connected to and disconnected from each other by operation of the switching element ULC. The switching element VHC is disposed between the high-level voltage terminal 124h and the terminal 122v, such that the high-level voltage terminal 124h and the terminal 122v are selectively connected to and disconnected from each other by operation of the switching element VHC. The switching element VLC is disposed between the low-level voltage terminal 124l and the terminal 122v, such that the low-level voltage terminal 124l and the terminal 122v are selectively connected to and disconnected from each other by operation of the switching element VLC. The switching element WHC is disposed between the high-level voltage terminal 124h and the terminal 122w, such that the high-level voltage terminal 124h and the terminal 122w are selectively connected to and disconnected from each other by operation of the switching element WHC. The switching element WLC is disposed between the low-level voltage terminal 124l and the terminal 122w, such that the low-level voltage terminal 124l and the terminal 122w are selectively connected to and disconnected from each other by operation of the switching element WLC. A switching element control circuit of the inverter 102 is operable to determine an angular position of the electric motor 70 based on signals detected by respective three Hall elements $H_A$, $H_B$, $H_C$ (each indicated by reference "H" in FIG. 6) provided in the electric motor, and to control the switching elements UHC, ULC, VHC, VLC, WHC, WLC such that each switching element is placed in one of ON and OFF states that is selected based on the determined angular position of the electric motor 70.

In the present suspension system 10, the electric motor 70 is placeable in four operational modes, and is operable with one of the four operational modes that is selected according to at least one predetermined condition. Each of the operational modes of the electric motor 70 is defined by an operational state of the inverter 102, i.e., the selected operational state of each switching element. That is, the selected operational mode of the electric motor 70 is changed by changing the selected operational state of at least one of the switching elements of the inverter 102.

The operational modes of the electric motor 70 can be classified into two kinds of modes, one of which is a controlled-power supplying mode in which the electric power is supplied from the buttery 108 to the electric motor 70 with the amount of the supplied electric power being controlled by controlling the ON/OFF state of the corresponding switching element according to a duty ratio, and the other of which is a no-power supplying mode in which the electric power is not supplied from the buttery 108 to the electric motor 70. In the present embodiment, the four operational modes of the electric motor 70 consist of the controlled-power supplying mode and also three no-power supplying modes in the form of a standby mode, a braking mode and a free mode.

(A) Controlled-Power Supplying Mode

In this controlled-power supplying mode, the ON/OFF state of each of the switching elements UHC, ULC, VHC, VLC, WHC, WLC is changed based on the detected angular position of the electric motor 70 in a so-called 120° rectangular-wave drive system, as shown in FIG. 7. In the present embodiment, only the three switching elements ULC, VLC, WLC (that are connected to the high-level voltage terminal 124h of the power source) are subjected to a duty-ratio control, and the amount of electric current supplied to the electric motor 70 is changed by changing the duty ratio. In FIG. 7, "1*" indicates that the switching element in question is subjected to the duty-ratio control. It is noted that combination of selected operational states of the switching elements varies depending on which one of opposite directions the generated motor force acts in. In FIG. 7, one of the opposite directions is referred to as "CW DIRECTION" while the other of the opposite directions is referred to as "CCW DIRECTION", for convenience of the description.

In the controlled-power supplying mode, the direction of the motor force generated by the electric motor 70 and the amount of the electric power supplied to the electric motor 70 are controllable thereby enabling the electric motor 70 to generate a desired magnitude of the motor force (that is dependent on the supplied electric power) such that the generated motor force acts in a desired direction. It is therefore possible to control the direction and magnitude of the displacement force generated by the adjuster device 20.

(B) Standby Mode

In the standby mode, the ON/OFF state of each switching element is changed according to a command indicative of a desired direction of generation of the motor force although the electric power is not supplied from the power source to the electric motor 70, as shown in FIG. 7. The ON/OFF state of each switching element is changed, also based on the angular position of the electric motor 70, like in the controlled-power supplying mode. However, unlike in the controlled-power supplying mode, any one of the three switching elements ULC, VLC, WLC (that are connected to the low-level voltage terminal 124l of the power source) is not subjected to the duty-ratio control. In other words, each of the three switching elements ULC, VLC, WLC is subjected to the duty-ratio control, such that the duty ratio is held 0 (zero). That is, each of the three switching elements ULC, VLC, WLC is practically held in the OFF state (open state) due to absence of pulse ON time. In FIG. 7, "0*" indicates that the switching element in question is placed in the state with the duty ratio of 0 (zero). Described specifically, when only the switching element VHC as one of the six switching elements is placed in the ON state (closed state), for example, there is established an electric continuity between the high-level voltage terminal 124h of the power source and the terminal 122v as one of the three terminals of the electric motor 70. This standby mode, in which the ON/OFF state of each switching element is thus changed, can be considered as a kind of specific-motor-terminal/power-supply-terminal connecting mode.

In the standby mode, the electric motor 70 can not be controlled to be moved since the electric power is not supplied to the electric motor 70. However, since the ON/OFF state of each switching element is changed as described above, a certain magnitude of the electromotive force can be generated by rotation of the electric motor 70 that is caused by application of an external force thereto, by adjusting the direction of rotation of the electric motor 70 and the direction of the generated motor force. In this case, the rotation of the electric motor 70 is somewhat braked whereby a resistance to the actuation of the actuator 26 is generated. A degree of the braking effect obtained in this standby mode is intermediate between those obtained in the braking mode and free mode that are described below.

(C) Braking Mode

The braking mode, in which the terminals 122u, 122v, 122w of the electric motor 70 are electrically connected to one another, can be considered as a kind of motor-terminals interconnecting mode. In this braking mode, three of the switching elements which are connected to the one of the high-level and low-level voltage terminals 124h, 124l are all held in the ON states while three of the switching elements which are connected to the other of the high-level and low-level voltage terminals 124h, 124l are all held in the OFF states. In the present embodiment, the switching elements UHC, VHC, WHC (that are connected to the high-level voltage terminal 124h of the power source) are all held in the ON states while the switching elements ULC, VLC, WLC (that are connected to the low-level voltage terminal 124l of the power source) are all held in the OFF states. Owing to the switching elements UHC, VHC, WHC held in the ON states, the electric motor 70 is placed in a state in which as if the phases of the electric motor 70 were short-circuited to one another. In this state, the rotation of the electric motor 70 is braked by the short circuit. Therefore, the actuator 30 generates a relatively large resistance, when being forced by an external force to be actuated at a high speed.

(D) Free Mode

In the free mode, the electric motor 70 is placed in a state in which as if the terminals 122 were opened. This free mode can be considered as a kind of motor-terminals disconnecting mode. Specifically described, the switching elements UHC, ULC, VHC, VLC, WHC, WLC are all held in the OFF states, the electromotive force is not substantially generated in the electric motor 70 so that the motor 70 provides no or little braking effect. Therefore, while the electric motor 80 is being placed in this free mode, the actuator 26 is actuated by an external force applied thereto, without substantial resistance against the actuation owing to the external force.

[Positive/Negative Efficiencies and Product of Positive/Negative Efficiencies]

There will be described an efficiency of the actuator 26, which is categorized into a positive efficiency and a negative efficiency. The negative efficiency $\eta_N$ corresponds to a parameter indicative of a magnitude of the motor force minimally required to inhibit the rotation of the electric motor 70 that could be caused by an external force acting on the motor 70. More precisely, the negative efficiency $\eta_N$ is defined as a ratio of the magnitude of the motor force minimally required to inhibit the rotation of the electric motor 70 caused by the external force, to a magnitude of the external force. On the other hand, the positive efficiency $\eta_P$ corresponds to a parameter indicative of the magnitude of the motor force minimally required to cause the shaft portion 60 of the L-shaped bar 22 to be rotated against the external force. More precisely, the positive efficiency $\eta_P$ is defined as a ratio of a magnitude of the external force, to the magnitude of the motor force minimally required to cause the rotation of the shaft portion 90. The positive efficiency $\eta_P$ and the negative efficiency $\eta_N$ can be expressed by respective expressions as follows:

$$\text{Positive efficiency } \eta_P = Fa/Fm \tag{1}$$

$$\text{Negative efficiency } \eta_N = Fm/Fa \tag{2}$$

where "Fa" represents the actuator force (actuator torque), and "Fm" represents the motor force (motor torque) generated by the motor 70.

Figure 8:
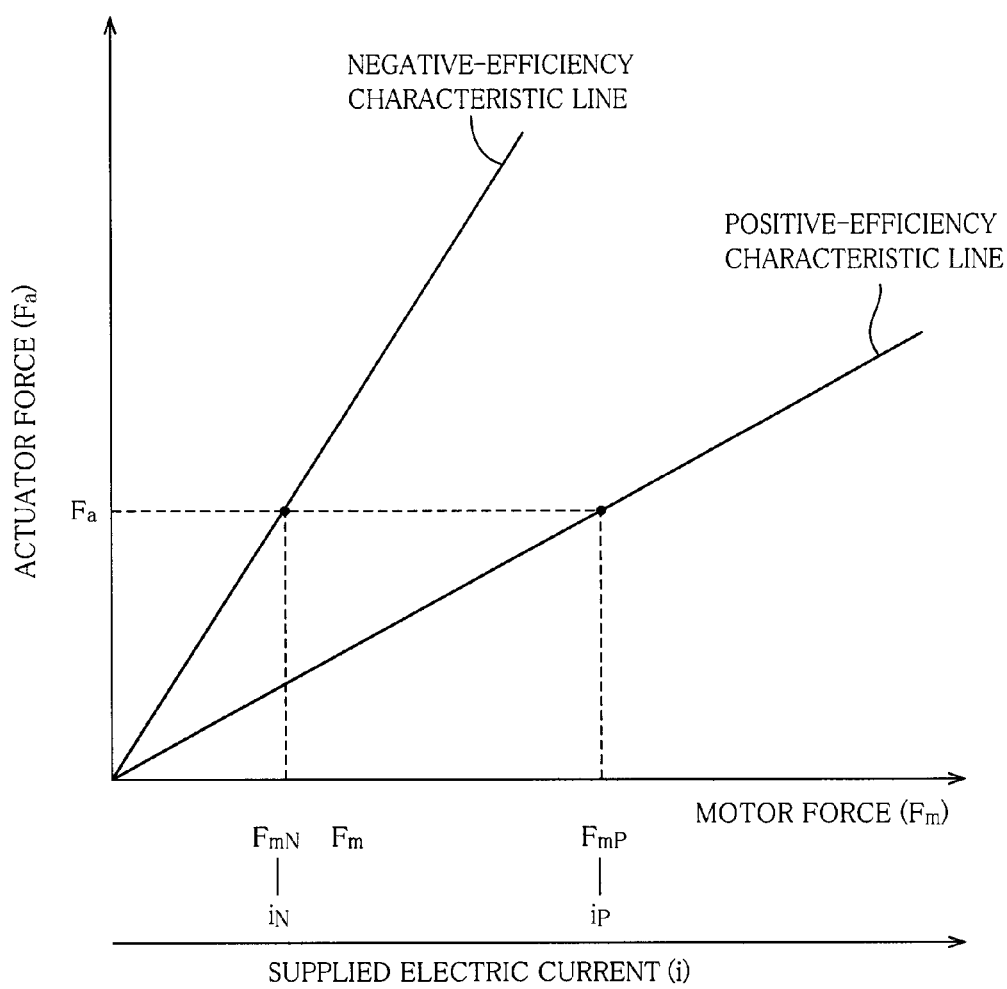
FIG. 8 is a graph showing a positive efficiency and a negative efficiency of the actuator in the embodiment of the invention.

The positive efficiency $\eta_P$ corresponds to an inclination of a positive-efficiency characteristic line that is shown in FIG. 8, while the negative efficiency $\eta_N$ corresponds to an inverse of an inclination of a negative-efficiency characteristic line that is also shown in FIG. 8. It can be considered that the motor force magnitude Fm is proportional to an electric current amount i supplied to the electric motor 70. As is apparent from FIG. 8, for producing the same magnitude of the actuator force Fa, the motor force magnitude $Fm_P$ of the motor 70 required under the positive efficiency characteristic is different from the motor force magnitude $Fm_N$ of the motor 70 required under the negative efficiency characteristic ($Fm_P > Fm_N$). From the above expressions (1) and (2), the following expressions can be obtained;

$$Fa = \eta_P \cdot Fm_P \tag{3}$$

$$Fa = (1/\eta_N) \cdot Fm_N \tag{4}$$

Therefore, a relationship between the motor force magnitude $Fm_P$ of the motor 70 required under the positive efficiency characteristic and the motor force magnitude $Fm_N$ of the motor 70 required under the negative efficiency characteristic can be expressed by the following expression:

$$Fm_N = \eta_P \cdot \eta_N \cdot Fm_P \tag{5}$$

As is apparent from the above expression (5), the motor force magnitude $Fm_N$ of the motor 70 required under the negative efficiency characteristic can be obtained by multiplying the motor force magnitude $Fm_P$ of the motor 70 required under the positive efficiency characteristic by a positive/negative efficiency product (that is a product of the positive efficiency $\eta_P$ and the negative efficiency $\eta_N$). Since it can be considered that the motor force magnitude Fm is proportional to the electric current amount i supplied to the electric motor 70, a relationship between an electric current amount $i_N$ supplied to the motor 70 to generate the motor force magnitude $Fm_N$ and an electric current amount $\eta_P$ supplied to the motor 70 to generate the motor force magnitude $Fm_P$ is expressed by the following expression:

$$i_N = \eta_P \cdot \eta_N \cdot i_P \tag{6}$$

As is apparent from the above expression (6), the electric current amount $i_N$ (required to inhibit actuation of the actuator 26) can be obtained by multiplying the electric current amount $i_P$ (required to cause actuation of the actuator 26) by the positive/negative efficiency product. In the present embodiment, the positive/negative efficiency product of the actuator 26 of the adjuster device 20 is about 1/3.

[Control of Vehicle Suspension System]

(A) Outline of Distance Adjustment Control

In the present suspension system 10, each of the four adjuster devices 20 is capable of adjusting a wheel-body distance (i.e., a distance between a corresponding one of the wheels 16) so as to perform a distance adjustment control. Described specifically, during turning of the vehicle, each of the adjuster devices 20 provided for inside wheels 16 (i.e., ones of the wheels 16 that are positioned between a center of the turning of the vehicle and the other wheels 16) is controlled to generate, as the displacement force, a force for reducing the wheel-body distance, while each of the adjuster devices 20 provided for outside wheels 16 is controlled to generate, as the displacement force, a force for increasing the wheel-body distance, for thereby restraining roll of the vehicle body resulting from the turning of the vehicle. In this instance, the magnitude of each force generated as the displacement force is dependent on a magnitude of roll moment resulting from the turning of the vehicle. Further, during acceleration of the vehicle, each of the adjuster devices 20 provided for front wheels 16 is controlled to generate, as the displacement force, a force for reducing the wheel-body distance, while each of the adjuster devices 20 provided for rear wheels 16 is controlled to generate, as the displacement force, a force for increasing the wheel-body distance, for thereby restraining rear-end squat of the vehicle body resulting from the acceleration of the vehicle. In this instance, the magnitude of each force generated as the displacement force is dependent on a magnitude of pitch moment resulting from the acceleration of the vehicle. Further, during deceleration of the vehicle, each of the adjuster devices 20 provided for the front wheels 16 is controlled to generate, as the displacement force, a force for increasing the wheel-body distance, while each of the adjuster devices 20 provided for the rear wheels 16 is controlled to generate, as the displacement force, a force for reducing the wheel-body distance, for thereby restraining front-end dive of the vehicle body resulting from the deceleration of the vehicle. In this instance, the magnitude of each force generated as the displacement force is dependent on a magnitude of pitch moment resulting from the deceleration of the vehicle. That is, in the present suspension system 10, the roll and pitch of the vehicle body can be restrained or reduced by the performance of the distance adjustment control.

(B) Outline of Damping Force Control

In the present suspension system 10, a damping-force control is performed to control each of the four adjuster devices 20 to generate the displacement force as a damping force for damping vibration of a part of the vehicle body that corresponds to the sprung member. In the present embodiment, each displacement force generated as the damping force is dependent on a movement velocity of the vehicle body in the vertical direction, i.e., an absolute velocity of the sprung member, so that the damping-force control is performed based on a so-called skyhook theory.

In the present suspension system 10, due to employment of the actuator 26 whose positive/negative efficiency product is relatively low, for example, each adjuster device 20 has a difficulty in coping with vibration of relatively high frequency. In view of this, each shock absorber 52 included in the suspension system 10 is provided by a shock absorber suitable for damping vibration of relatively high frequency, so that transmission of the vibration of relatively high frequency to the vehicle body is restrained by operation of the shock absorber 52. That is, in the present suspension system 10, the vibration of low frequency range including a resonance frequency of the sprung member is coped with by the adjuster device 20, because the vibration of the low frequency range can be followed by operation of the actuator 26. Meanwhile, the vibration of high frequency range including a resonance frequency of the unsprung member is coped with by the shock absorber 52. Consequently, the present suspension system 10 exhibits an excellent damping characteristic for effectively damping the vibration of a wide frequency range. It is noted that the vibration of the unsprung member is not coped with by the vibration damping control performed by the adjuster device 20 since it is performed based on the skyhook theory. In view of this, the shock absorber 52 is provided by a shock absorber that is suitable for damping the vibration of the unsprung member, namely, suitable for restraining fluctuation of a load applied to a contact portion of the wheel which is in contact with a road surface. For assuring such a suitable function, the shock absorber 52 has a damping coefficient that is tuned to be low. In the present embodiment, specifically described, the damping coefficient is 1000-2000 N, which is lower than a half of 3000-5000 N that is a damping coefficient of a conventional shock absorber of a suspension system not having the adjuster device 20.

(C) Outline of Methods of Controls

The distance adjustment control, which is directed to adjust the wheel-body distance, is executed by the above-described actuator actuation amount control in which the amount of actuation of the actuator 26 is directly subjected to the control. The actuation amount control is performed to cause an actual amount of the actuation of the actuator 26 to be equalized to a target amount of the actuation of the actuator 26. The distance adjustment control is executed by the actuation amount control, according to a feedback controlling method, so that the actuation amount of the actuator 26 is controlled based on a deviation of the feedback actual actuation amount of the actuator 26 from the target actuation amount of the actuator 26.

In the distance adjustment control, where an external force acts on the actuator 26, for example, during turning, acceleration or deceleration of the vehicle, it is necessary to cause the actuator 26 to generate the actuator force for inhibiting itself from being actuated by the external force, such that the actual actuation amount of the actuator 26 is maintained in the target actuation amount. If the actuator force is not generated, the actual actuation amount is deviated from the target actuation amount. That is, the adjuster device 20 is required to generate the displacement force acting against the external force. For generating the actuator force for maintaining the target actuation amount, the feedback controlling method is employed to determine an amount of the electric power that is to be supplied to the electric motor 70. Described specifically, the amount of the supplied electric power is determined according to PI control rule such that a component based on an integral value of the above-described deviation, i.e., a component dependent on an integral term (I-term) serves as a component of the target amount of the electric power corresponding to the actuator force for maintaining the target actuation amount. The distance adjustment control is thus executed according to the feedback controlling method.

It is noted that, in the controls executed in the present suspension system 10, the actuation amount of the actuator 26 is treated as an amount from a reference operating position of the actuator 26. The reference operating position corresponds to an operating position of the actuator 26 in which no actuator force is generated by the actuator 26 in a reference state in which it is regarded that an external force such as roll moment and pitch moment does not substantially act on the vehicle body without vibration being caused in the vehicle body and the wheel 16. Further, since the actuation amount of the actuator 26 and the angular position of the electric motor 70 correspond to each other, the angular position of the electric motor 70 (that is detected by the rotation angle sensor 84), in place of the actuation amount of the actuator 26, is subjected to the controls in the present embodiment.

Meanwhile, in the damping-force control, the displacement force is required to be fluctuated or changed at a considerably short cycle, so as to act as the damping force for damping vibration of the sprung member. Therefore, the damping-force control is required to be executed with a high responsiveness to change of absolute velocity of the sprung member. Where the damping force is executed according to the PI control rule in the feedback controlling method, three is a possibility that the control could not be executed with a high responsiveness, for example, due to presence of the component of the supplied electric power that is determined based on the above-described integral term. In view of such a possibility, in the present suspension system 10, for assuring a high responsiveness, the actuator force for generating the displacement force serving as the damping force, more specifically, the motor force corresponding to the actuator force is directly subjected to the damping-force control, so that the damping-force control is executed, by determining the amount of the electric power supplied to the electric motor 70, based on the absolute velocity of the sprung member and according to a predetermined relationship between the magnitude of the motor force and the amount of the supplied electric power. That is, the damping-force control is thus executed according to an open-loop control rather than a feedback control.

(D) Detailed Description of Distance Adjustment Control (i) Determination of Target Angular Position of Motor in Distance Adjustment Control In the distance adjustment control, a distance-adjustment directed component $\theta^*_K$ (distance-adjustment-correspondent component) of the target angular position $\theta^*$ of the electric motor 70 is determined as a target motor angular position in execution of the distance adjustment control. The distance-adjustment directed component $\theta^*_K$ consists of a roll-reduction directed subcomponent $\theta^*_R$ as a subcomponent directed to restrain or reduce roll of the vehicle body and a pitch-reduction directed subcomponent $\theta^*_P$ as a subcomponent directed to restrain or reduce pitch of the vehicle body. The roll-reduction directed subcomponent $\theta^*_R$ and the pitch-reduction directed subcomponent $\theta^*_P$ are determined independently of each other, and the distance-adjustment directed component $\theta^*_K$ is determined by adding the determined two subcomponents $\theta^*_R$, $\theta^*_P$ to each other.

The roll-reduction directed subcomponent $\theta^*_R$ of the distance-adjustment directed component $\theta^*_K$ is determined based on the lateral acceleration serving as an index of the roll moment acting on the vehicle body. Described in detail, a parameter value Gy* of the lateral acceleration (that is used as a parameter in the control) is determined, on the basis of an estimated value Gyc of the lateral acceleration estimated based on the operating angle δ of the steering wheel and the running speed V of the vehicle and also a measured value Gyr of the lateral acceleration, and according to the following expression:

$$Gy^* = K_A \cdot Gyc + K_B \cdot Gyr \quad (7),$$

where "$K_A$", "$K_B$" represents respective gains.

The roll-reduction directed subcomponent $\theta^*_R$ is determined based on the lateral acceleration parameter value Gy* that is determined as described above. The controller 104 of the adjuster ECU 100 stores a data map indicative of relationship between the roll-reduction directed subcomponent $\theta^*_R$ and the lateral acceleration parameter value Gy*, so that the roll-reduction directed subcomponent $\theta^*_R$ can be determined with reference to the data map.

The pitch-reduction directed subcomponent $\theta^*_P$ of the distance-adjustment directed component $\theta^*_K$ is determined based on the longitudinal acceleration serving as an index of the pitch moment acting on the vehicle body. Described in detail, the pitch-reduction directed subcomponent $\theta^*_P$ is determined on the basis of an actual longitudinal acceleration value Gzg that is detected by the longitudinal acceleration sensor 114 and according to the following expression:

$$\theta^*_P = Kc \cdot Gzg \quad (8)$$

where "Kc" represents a gain.

The distance-adjustment directed component $\theta^*_K$ is determined based on the determined roll-reduction directed subcomponent $\theta^*_R$ and pitch-reduction directed subcomponent $\theta^*_P$ and according to the following expression:

$$\theta^*_K = \theta^*_R + \theta^*_P \quad (9)$$

(ii) Determination of Electric Current Supplied to Motor in Distance Adjustment Control In the distance adjustment control, a distance-adjustment directed component $i^*_K$ of the target amount of the supplied electric current is determined as a target supplied electric current amount in execution of the distance adjustment control. The distance-adjustment directed component $i^*_K$ of the target electric current amount is determined according to the PI control rule in the feedback control method. Described specifically, an actual angular position $\theta$ of the electric motor 70 is first obtained based on a value detected by the angular position sensor 84 that is provided in the motor 70, and then a deviation $\Delta\theta_K (=\theta^*-\theta)$ of an actual angular position $\theta$ of the motor 70 from the above-described distance-adjustment directed component $\theta^*_K$ of the target angular position $\theta^*$ of the motor 70 is calculated. The distance-adjustment directed component $i^*_K$ of the target electric current amount is determined based on the angular position deviation $\Delta\theta_K$ and according to the following expression:

$$i^*_K = K_1 \cdot \Delta\theta_K + K_2 \cdot Int(\Delta\theta_K) \quad (10)$$

A right side of the above expression (10), which is according to the PI control rule, consists of two terms, i.e., a first term and a second term that are a proportional term and an integral term, respectively. "$K_1$", "$K_2$" represent proportional and integral gains, respectively. "Int ($\Delta\theta_K$)" represents an integral value of the angular position deviation $\Delta\theta_K$.

In the present suspension system 10, the distance-adjustment directed component $i^*_K$ of the target electric current amount is determined according to the PI control rule. However, the distance-adjustment directed component $i^*_K$ can be determined according to PID control rule, too. The determination according to PID control rule is made with the following expression:

$$i^*_K = K_1 \cdot \Delta\theta_K + K_2 \cdot Int(\Delta\theta_K) + K_3 \cdot \Delta\theta_K' \quad (11)$$

A right side of the above expression (11), which is according to the PID control rule, includes a derivative term (D-term), i.e., a derivative value of the angular position deviation $\Delta\theta_K$. "$K_3$" represents a derivative gain.

(iii) Reduction of Electric Current in Distance Adjustment Control

Figure 9:
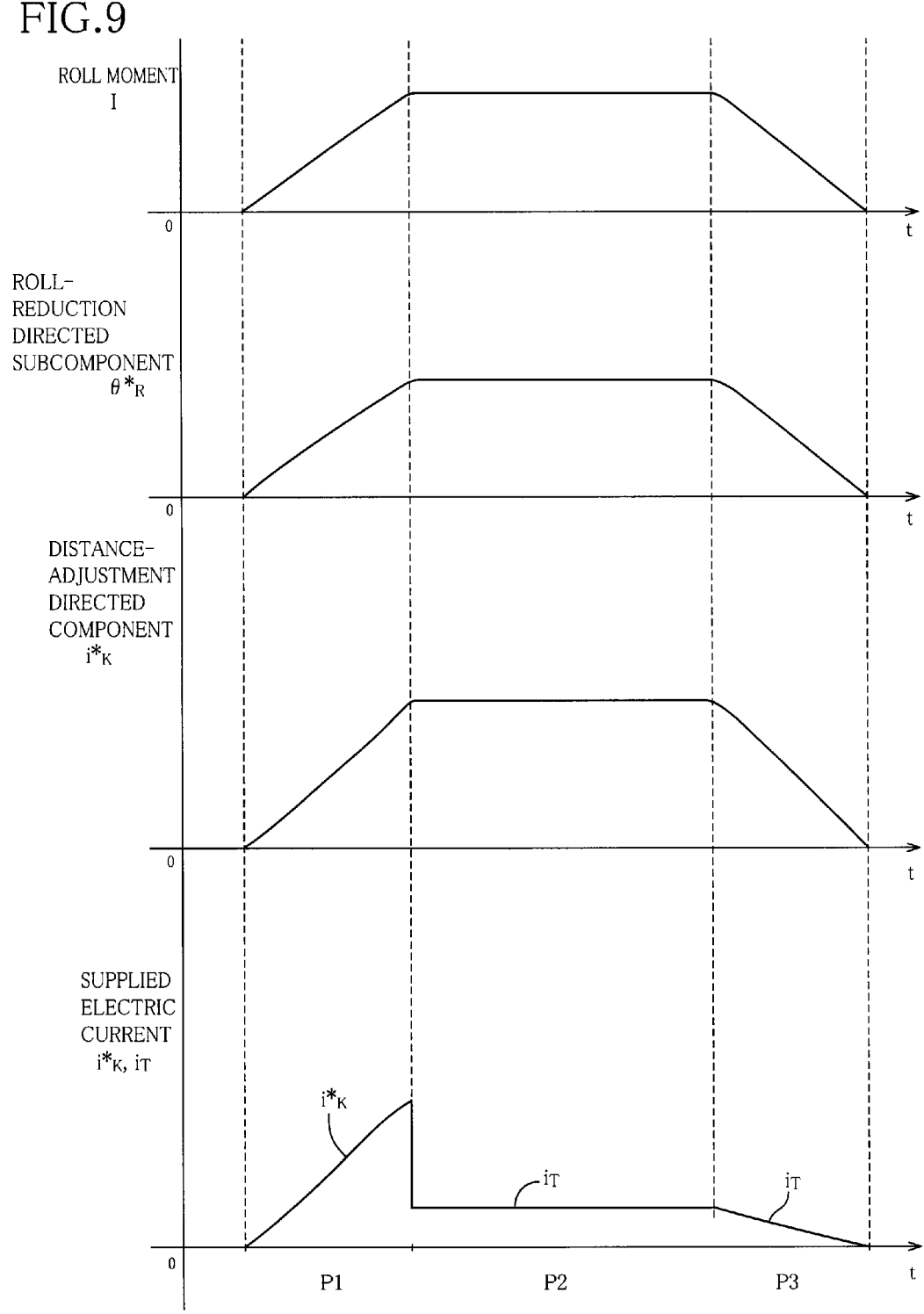
FIG. 9 is a graph showing chronological changes of roll moment, roll-reduction directed subcomponent, distance-adjustment directed component and electric current amount supplied to the electric motor, during turning of the vehicle.

During a typical example of turning of the vehicle in a state in which the running speed is not substantially changed, roll moment acting on the vehicle body is changed as indicated in a graph of FIG. 9. As is understood from FIG. 9, the roll moment is increased in an initial stage P1 of the turning, is held substantially constant in an intermediate stage P2 of the turning, and is reduced in a final stage P3 of the turning. In the distance adjustment control during such turning of the vehicle, the roll-reduction directed subcomponent $\theta^*_R$ of the distance-adjustment directed component $\theta^*_K$ of the target angular position $\theta^*$ of the electric motor 70 is required to be changed as shown in FIG. 9, for restraining the roll of the vehicle body, and the distance-adjustment directed component $i^*_K$ of the target electric current amount is determined as shown in FIG. 9.

As is apparent from FIG. 9, in the initial stage P1 of the turning of the vehicle, the roll-reduction directed subcomponent $\theta^*_R$ (of the distance-adjustment directed component $\theta^*_K$ of the target angular position $\theta^*$ of the electric motor 70), i.e., the target actuation amount of the actuator 26 is increased, so that the actuation amount of the actuator 26 has to be increased against the roll moment as an external force. To this end, distance-adjustment directed component $i^*_K$ of the target electric current amount is determined such that the electric motor 70 generates a magnitude of the motor force that is required for causing the actuator 26 to be actuated against the external force. The roll moment is held substantially constant in the intermediate stage P2, and is reduced in the final stage P3, so that the motor force is required by a small degree that is sufficient for merely inhibiting the actuator force 26 from being actuated by the external force in the intermediate and final stages P2, P3. Thus, in the theses stages P2, P3, what is to be supplied to the electric motor 70 is only a reduced electric current amount $i_T$ that is smaller than the above-described distance-adjustment directed component $i^*_K$. Since the magnitude of the motor force for causing the actuator 26 to be actuated against the external force is dependent on the positive efficiency $\eta_P$ of the actuator 26 while the magnitude of the motor force for inhibiting the actuator 26 from being actuated by the external force is dependent on the negative efficiency $\eta_N$ of the actuator 26, the above-described reduced electric current amount $i_T$ is determined based on the above-described positive/negative efficiency product $\eta_P \cdot \eta_N$ and according to the following expression:

$$i_T = \eta_P \cdot \eta_N \cdot i^*_K \tag{12}$$

That is, in the distance adjustment control, an amount of the electric current corresponding to the distance-adjustment directed component $i^*_K$ is supplied to the electric motor 70 in the initial stage P1 of the turning of the vehicle in which the actuation amount of the actuator 26 is increased, and an amount of the electric current corresponding to the reduced electric current amount $i_T$ is supplied to the motor 70 in the intermediate and final stages P2, P3 in which the actuation amount of the actuator 26 is held constant and reduced.

While the above description relates to reduction of the roll of the vehicle body, substantially the same description can be applied to reduction of the pitch of the vehicle body. Therefore, where the pitch of the vehicle body is to be reduced, too, an amount of the electric current corresponding to the distance-adjustment directed component $i^*_K$ is supplied to the electric motor 70 in the stage in which the actuation amount of the actuator 26 is increased, and an amount of the electric current corresponding to the reduced electric current amount $i_T$ is supplied to the motor 70 in the stages in which the actuation amount of the actuator 26 is held constant and reduced. In the present distance adjustment control, the roll reduction control and the pitch reduction control are unified, by determining the distance-adjustment directed component $\theta^*_K$ (of target angular position $\theta^*$ of the electric motor 70) as the sum of the roll-reduction directed subcomponent $\theta^*_R$ and the pitch-reduction directed subcomponent $\theta^*_P$. Therefore, in the distance adjustment control, irrespective of which one of the roll and pitch is to be reduced, an amount of the electric current corresponding to the distance-adjustment directed component $i^*_K$ is supplied to the electric motor 70 in the stage in which the actuation amount is increased, and an amount of the electric current corresponding to the reduced electric current amount $i_T$ is supplied to the motor 70 in the stages in which the actuation amount is held constant and reduced. Thus, in the present suspension system 10, the amount of the electric power consumed by the motor 70 can be reduced by reducing the supplied electric current amount.

The direction of the motor force generated by the electric motor 70 is dependent on whether each of the distance-adjustment directed component $i^*_K$ of the target electric current amount and the reduced electric current amount $i_T$ is a positive value or a negative value. In control of drive of the motor 70, the duty ratio and the direction of the generated motor force are determined based on the distance-adjustment directed component $i^*_K$ and the reduced electric current amount $i_T$. Then, a command indicative of the determined duty ratio and motor force direction is directed to the inverter 102, and the motor 70 is controlled based on the command by the inverter 102 while being placed in the controlled-power supplying mode as the operational mode.

(E) Detailed Description of Damping-Force Control
(i) Determination of Electric Current Supplied to Motor in Damping-Force Control The damping-force control is executed such that the displacement force generated by the adjuster device 20 acts as the damping force whose magnitude corresponds to an absolute velocity of the sprung member. In the damping-force control, a damping force magnitude $F_G$ is determined as a magnitude of the displacement force that is to be generated in the control. Specifically, an absolute velocity V of the vehicle body is calculated based on a vertical acceleration detected by the vertical acceleration sensor 116 that is disposed on the mount portion 54 of the vehicle body, and then the damping force magnitude $F_G$ is determined according to the following expression:

$$F_G = C \cdot V \tag{13},$$

where "C" represents a damping coefficient.

In the damping-force control, a damping-force directed component $i^*_G$ of the target amount of the supplied electric current is determined as a component for generating a magnitude of the actuator or motor force that corresponds to a magnitude of the displacement force, so that the magnitude of the displacement force corresponding to the determined damping force magnitude $F_G$ is generated. This determination of the damping-force directed component $i^*_G$ is made with reference to a map that is stored in the controller 104 of the adjuster ECU 100.

(ii) Reduction of Electric Current in Damping-Force Control

Figure 10:
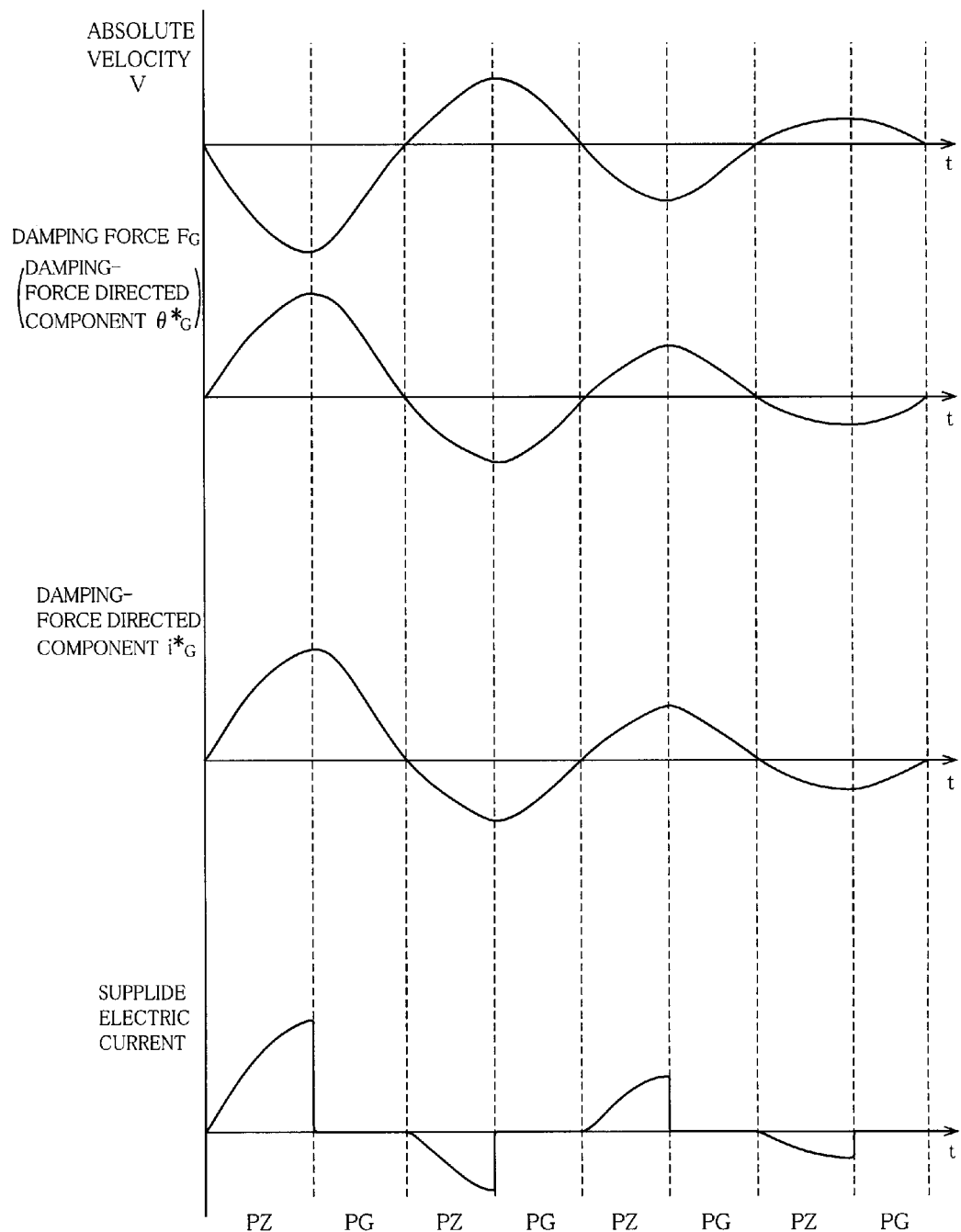
FIG. 10 is a graph showing chronological changes of absolute velocity, damping force, damping-force directed component and electric current amount supplied to the electric motor, during vibration of the vehicle body.

In a state, described by way of example, in which typical vibration is occurred in the vehicle body, the absolute velocity V of the sprung member (i.e., absolute velocity of a part of the vehicle body serving as the sprung member) is changed as shown in a graph of FIG. 10. As is apparent from the graph, the absolute velocity V of the sprung member is changed such that its velocity increasing stages PZ and its velocity reducing stages PG are alternated. For damping such vibration of the vehicle body, the damping force magnitude $F_G$ as shown in FIG. 10 is required, so that a damping-force directed component $i^*_G$ of the target electric current amount is determined as shown in FIG. 10 in the damping-force control. In view of construction of the adjuster device 20, the magnitude of the displacement force generated by the adjuster device 20 and the actuation amount of the actuator 26 correspond to each other in a theoretical sense. Therefore, as long as the damping-force control is executed such that the angular position of the electric motor 70 corresponding to the damping force magnitude $F_G$ is subjected to the control, a damping-force directed component $\theta^*_G$ (damping-force-correspondent component) of the target angular position $\theta^*$ of the electric motor 70 is changed as the same as the damping force magnitude $F_G$.

The adjuster device 20 is constructed such that an amount of torsion of the shaft portion 60 of the L-shaped bar 22 is changed according to the actuation amount of the actuator 26. In the velocity increasing stages PZ in which the damping-force directed component $\theta^*_G$ of the target angular position $\theta^*$, i.e., the target actuation amount of the actuator 26 is increased, an amount of deformation of the elastic body needs to be increased. To this end, since the magnitude of the actuator force needs to be increased against reaction to the torsion of the shaft portion 60 of the L-shaped bar 22, the damping-force directed component $i^*_G$ of the target amount of the supplied electric current is determined such that the electric power whose amount corresponds to such need is supped to the electric motor 70. In the velocity reducing stages PG in which the damping-force directed component $\theta^*_G$ of the target angular position $\theta^*$, i.e., the target actuation amount of the actuator 26 is reduced, the magnitude of the motor force is not required to be as large as that required in the velocity increasing stages PZ, since the actuation amount of the actuator 26 can be reduced by utilizing the external force, namely, the reaction of the shaft portion 60 to its torsion (i.e., restoring force of the shaft portion 60). That is, in the velocity reducing stages PG (processes of reduction in the target actuation amount) in which the actuation amount of the actuator 26 is reduced, namely, in the stages in which the operating position of the actuator 26 is returned to its neutral position, the supply of the electric power to the electric motor 70 is inhibited since the reaction force helps the reduction of the actuation amount of the actuator 26. Therefore, in the damping-force control, the electric current is supplied to the motor 70 by the damping-force directed component $i^*_G$ of the target amount only in the in the velocity increasing stages PZ (processes of increase in the target actuation amount). Thus, in the present suspension system 10, the amount of the electric power consumed by the motor 70 can be reduced in the damping-force control, too.

(iii) Switching of Operational Mode of Electric Motor

Like in the above-described distance adjustment control, in the damping-force control, a command indicative of the duty ratio and motor force direction based on the damping-force directed component $i^*_G$ of the target amount of the supplied electric current is issued to the inverter 102 in the process of increase in the actuation amount of the actuator 26, and the electric motor 70 is controlled based on the command by the inverter 102 while being placed in the controlled-power supplying mode as the operational mode.

On the other hand, in the process of reduction in the actuation amount, although the supply of the electric power to the electric motor 70 is inhibited, it is preferable that some magnitude of the motor force is generated. In the actuation amount reduction process, the actuation amount of the actuator 26 is reduced by utilizing the external force in the form of the torsion reaction of the shaft portion 60 of the L-shaped bar 22, as described above. However, there would be occurred a phenomenon that a suitable magnitude of the damping force could not be obtained in case of excessive reduction in the actuation amount of the actuator 26. In view of such a possible phenomenon, the generation of some magnitude of the motor force is preferable even in the actuation amount reduction process, for assuring stability of the actuation of the actuator 26. Further, a magnitude of the torsion reaction and the actuation amount of the actuator 26 correspond to each other, so that the magnitude of the torsion reaction is increased with increase in the actuation amount of the actuator 26 while the magnitude of the torsion reaction is reduced with reduction in the actuation amount of the actuator 26. It is therefore preferable that the motor force is generated by a suitable magnitude corresponding to the actuation amount in the actuation amount reduction process.

In the present suspension system 10, for causing the electric motor 70 to generate the suitable magnitude of the motor force without supply of the electric power to the motor 70 in the actuation amount reduction process, operational modes other than the above-described controlled-power supplying mode is established as the operational mode of the motor 70 in the actuation amount reduction process. Described specifically, the motor 70 is placed in the above-described braking mode when the actuation amount of the actuator 26 is relatively large, and is placed in the above-described free mode when the actuation amount is relatively small. Further, when the actuation amount is intermediate between the large and small amounts, the motor 70 is placed in the standby mode, precisely, which is arranged depending on the direction of the motor force. With the motor 70 being placed in one of the operational modes that is selected depending on the actuation amount, it is possible to generate the suitable magnitude of the motor force and also to reduce the amount of the electric power consumed by the motor 70. Further, the inverter 102 can be configured to make it possible to regenerate the electric power based on the electromotive force, as described above, in any of the three operational modes of the motor 70. Therefore, by recycling the regenerated electric power, the present suspension system 10 can be more advantageous from a point of view of electric power saving.

(F) Concurrent Performances of Distance Adjustment Control and Damping-Force Control In the present suspension system 10, the above-described damping-force control and distance adjustment control can be executed or performed concurrently with each other. The two controls are performed in a unified manner, by adding the distance-adjustment directed component $i^*_K$ and the damping-force directed component $i^*_G$ (of the target amount of the supplied electric current) to each other. Specifically, the target amount $i^*$ of the electric current that is to supplied in the concurrent performances of the two controls is determined based on the distance-adjustment directed component $i^*_K$ and damping-force directed component $i^*_G$ and according to the following expression:

$$i^* = i^*_G + i^*_K \qquad (14).$$

As described above, in the distance adjustment control, the distance-adjustment directed component $i^*_K$ is determined based on the above-described deviation $\Delta\theta_K$ (of the actual angular position $\theta$ of the electric motor 70 from the distance-adjustment directed component $\theta^*_K$ of the target angular position $\theta^*$ of the motor 70) according to a feedback control method. Therefore, in the concurrent performances of the two controls, the determination of the distance-adjustment directed component $i^*_K$ is influenced by the rotation of the motor 70 that is caused for generating the displacement force in the damping-force control. With account being taken of such influence, in the concurrent performances of the two controls, the distance-adjustment directed component $i^*_K$ is determined as described below.

First, the damping-force directed component $\theta^*_G$ of the target angular position $\theta^*$ is determined based on the damping force magnitude $F_G$ and according to the following expression:

$$\theta^*_G = K_D \cdot F_G \qquad (15),$$

where "$K_D$" represents a gain.

The target angular position $\theta^*$ of the electric motor 70 is determined as a reference angular position in the concurrent performances of the two controls, based on the above-described roll-reduction directed subcomponent $\theta^*_R$ and pitch-reduction directed subcomponent $\theta^*_P$ (of the distance-adjustment directed component $\theta^*_K$ of the target angular position $\theta^*$ of the motor 70) and according to the following expression:

$$\theta^* = \theta^*_G + \theta^*_R + \theta^*_P \qquad (16).$$

Next, a deviation $\Delta\theta$ ($=\theta^*-\theta$) of an actual angular position $\theta$ of the motor 70 from the target angular position $\theta^*$ of the motor 70 is calculated, and the distance-adjustment directed component i*$_K$ is determined based on the calculated deviation $\Delta\theta$ and according to the following expression:

$$i^*_K = K_1 \cdot \Delta\theta + K_2 \cdot Int(\Delta\theta) \quad (17).$$

That is, the distance-adjustment directed component i*$_K$ is determined with account being taken of the amount of the rotation of the motor 70 that is possibly made by the damping-force control. It is noted that "$K_1$", "$K_2$" in the above expression (17) represent the proportional and integral gains, respectively.

Where the damping-force control and the distance adjustment control are performed concurrently with each other, it is preferable that the electric power is supplied from the power source to the electric motor 70 in most case, due to presence of the integral term component in the above expression (16) for determining the distance-adjustment directed component i*$_K$. Therefore, the drive control of the motor 70 is executed in the same manner as in the above-described distance adjustment control. Specifically described, it is determined whether the actuation amount of the actuator 26 is being increased or not, based on the target angular position $\theta^*$. Then, when the actuation amount is being increased, a command indicative of the motor force direction and duty ratio based on the target electric current amount i* is directed to the inverter 102, so that the drive of the electric motor 70 is controlled according to the command by the inverter 102 while being placed in the controlled-power supplying mode as the operational mode. On the other hand, when the actuation amount is being held substantially constant or reduced, the reduced electric current amount $i_T$ is determined based on the above-described positive/negative efficiency product $\eta_P \cdot \eta_N$ and according to the following expression:

$$i_T = \eta_P \cdot \eta_N \cdot i^* \quad (18).$$

Then, a command indicative of the thus determined reduced electric current amount $i_T$ is directed to the inverter 102.

Figure 11:
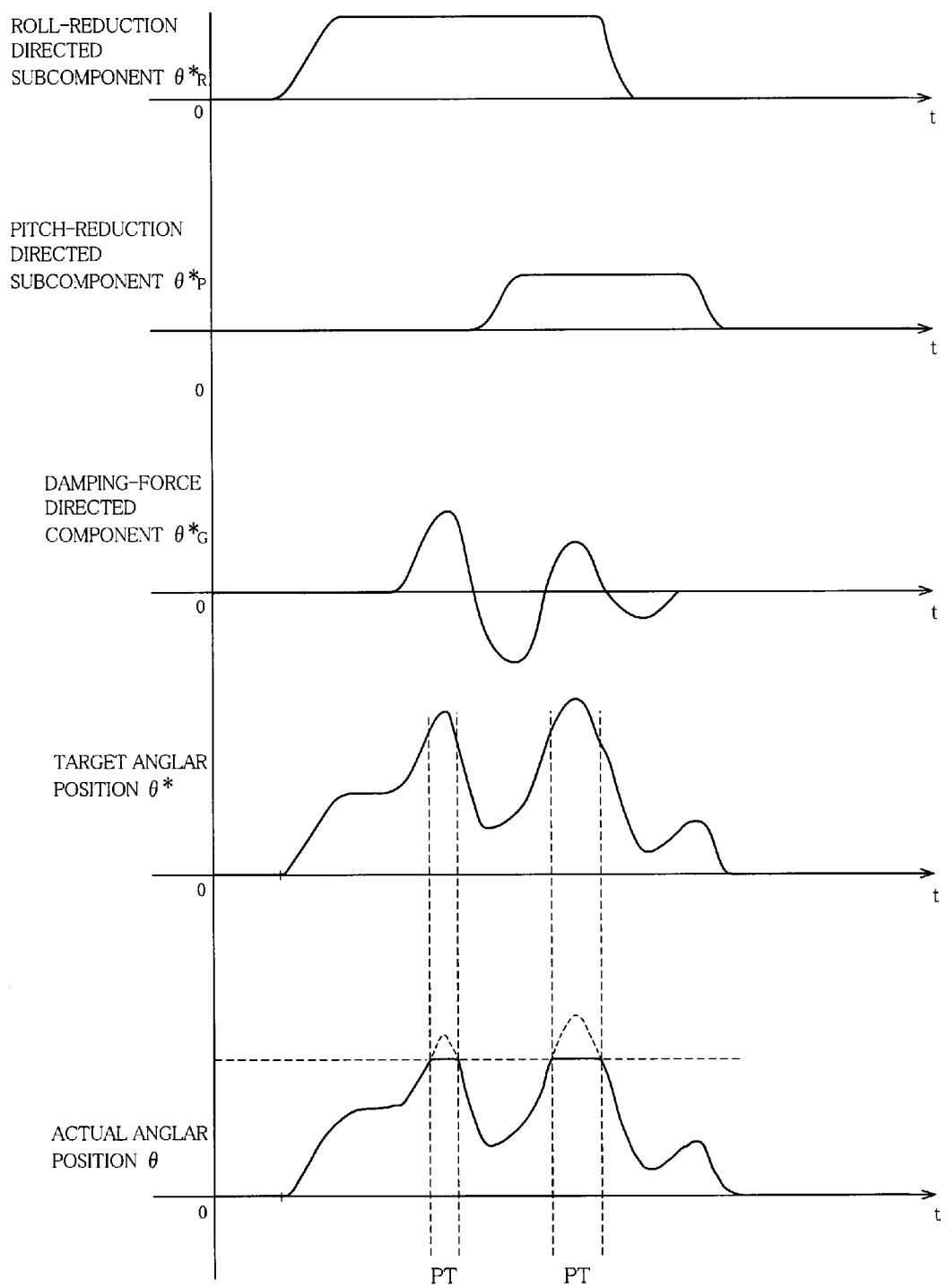
FIG. 11 is a graph showing chronological changes of roll-reduction directed subcomponent, pitch-reduction directed subcomponent, damping-force directed component, target angular position (as a sum of the roll-reduction directed subcomponent, pitch-reduction directed subcomponent and damping-force directed component) and actual angular position, during running of the vehicle.

In the present suspension system 10, there is an upper limit on the magnitude of the generable motor force, i.e., the displacement force generable by the adjuster device 20, due to factors such as constructions of the electric motor 70 and the actuator 26. Therefore, where the required magnitude of the displacement force exceeds the upper limit, the actual actuation amount of the actuator 26 cannot reach the target actuation amount, no matter how large the supplied electric power is. Particularly, where the damping-force control, roll reduction control and pitch reduction control are executed concurrently with one another, there is a high possibility of excess of the required magnitude over the upper limit. FIG. 11 shows, by way of example, stages (each indicated by "PT" in FIG. 11) in which the target angular position $\theta^*$ is so large that the actual angular position $\theta$ can not reach it. With account being taken of such stages, in the present suspension system 10, it is determined whether the actuation amount of the actuator 26 is being increased or not, based on change in the target angular position $\theta^*$. This determination is made not only where the distance adjustment control and the damping-force control are concurrently executed but also where either one of the two controls is executed. Therefore, where only the distance adjustment control is executed individually or where the two controls are concurrently executed, the supplied electric current can be reduced at assuredly appropriate points of time. Where only the damping-force control is executed, the operational state of the electric motor 70 can be switched at assuredly appropriate points of time, and the supply of the electric power from the power source to the motor 70 can be suspended at assuredly appropriate points of time.

[Adjuster Device Controlling Routine Program]

Figure 12:
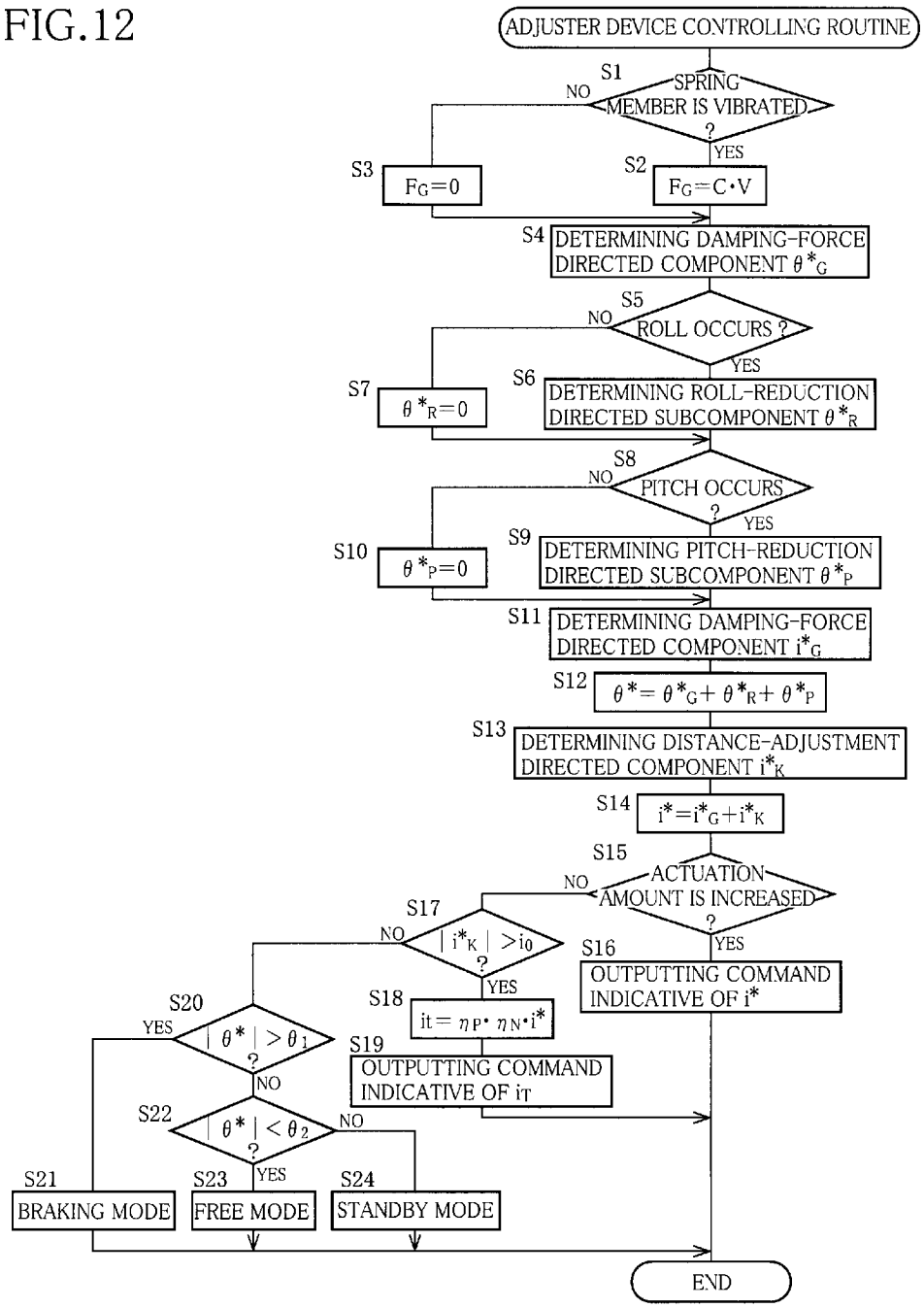
FIG. 12 is a flow chart showing an adjuster-device controlling routine program that is executed in the suspension system of FIG. 2.

The above-above-described controls are executed by the controller 104 of the adjuster ECU 100, in accordance with an adjuster-device controlling routine program illustrated in a flow chart of FIG. 12. This controlling routine program is repeatedly executed at a short time interval (e.g., several tens of milliseconds), while an ignition switch of the vehicle is placed in its ON state. It is noted that the damping-force control and the distance adjustment control can be performed concurrently with each other in the execution of this controlling routine program. Hereinafter, the controlling routine program will be described by reference to the flow chart of FIG. 12.

The adjuster-device controlling routine program is executed for each of the actuators 26 of the respective four adjuster devices 20. In the following description as to the controlling routine program, there will be described a procedure made for one of the actuators 26 in execution of the routine program, for simplifying the description.

The controlling routine program is initiated with step S1 of determining whether the sprung member is being vibrated or not. Specifically described, it is determined that the sprung member is being vibrated, if the vertical acceleration of the vehicle body detected by the vertical acceleration sensor 116 is higher than an upper threshold value. An affirmative determination (YES) obtained in step S1 is followed by step S2 that is implemented to determine, based on the absolute velocity V of the sprung member that is calculated from the vertical acceleration, the damping force magnitude $F_G$ required for performing the damping-force control. On the other hand, if a negative determination (NO) is obtained in step S1, the damping force magnitude $F_G$ is set at 0 (zero) in step S3. Step S2 or S3 is followed by step S4 that is implemented to determine the damping-force directed component $\theta^*_G$ of the target angular position $\theta^*$ of the electric motor 70, based on the damping force magnitude $F_G$. It is noted that the damping-force directed component $\theta^*_G$ is set at 0 (zero) where the damping-force control is not performed.

Subsequently, step S5 is implemented to determine whether roll of the vehicle body occurs. It is determined that the roll of the vehicle body is practically caused as a result of turning of the vehicle when the operating angle of the steering wheel is not smaller than a threshold and the running speed of the vehicle is not smaller than a threshold. If an affirmative determination (YES) is obtained in step S5, the control flow goes to step S6 that is implemented to determine, based on the above-described parameter value Gy* of the lateral acceleration, the roll-reduction directed subcomponent $\theta^*_R$ of the target angular position $\theta^*$of the electric motor 70, for reducing the roll of the vehicle body by the distance adjustment control. On the other hand, if a negative determination (NO) is obtained in step S5, the roll-reduction directed subcomponent $\theta^*_R$ set at 0 (zero) in step S7. Step S6 or S7 is followed by step S8 that is implemented to determine whether pitch of the vehicle body occurs. It is determined that the pitch of the vehicle body is practically caused when an absolute value of the longitudinal acceleration is not smaller than a threshold. If an affirmative determination (YES) is obtained in step S8, the control flow goes to step S9 that is implemented to determine, based on the longitudinal acceleration, the pitch-reduction directed subcomponent $\theta^*_P$ of the target angular position $\theta^*$ of the electric motor 70, for reducing the pitch of the vehicle body by the distance adjustment control. On the other hand, if a negative determination (NO) is obtained in step S8, the pitch-reduction directed subcomponent $\theta^*_P$ set at 0 (zero) in step S10.

Next, step S11 is implemented to determine the damping-force directed component $i^*_G$ (of the target electric current amount $i^*$) based on the damping force magnitude $F_G$ (that has been determined in step S2 or S3) and according to an open-loop control method. Step S11 is followed by step S12 in which the target angular position $\theta^*$ is determined by adding the roll-reduction directed subcomponent $\theta^*_R$ (that has been determined in step S6 or S7), pitch-reduction directed subcomponent $\theta^*_P$ (that has been determined in step S9 or S10) and damping-force directed component $\theta^*_G$ (that has been determined in step S4) to one another. Then, in step S13, the positional deviation $\Delta\theta$ is calculated from target angular position $\theta^*$ and the actual angular position $\theta$ of the electric motor 70, and then the distance-adjustment directed component $i^*_K$ (of the target electric current amount $i^*$) is determined according to a feedback control method. Step S13 is followed by step S14 in which the target electric current amount $i^*$ is determined by adding the damping-force directed component $i^*_G$ and distance-adjustment directed component $i^*_K$ to each other.

Subsequently, step S15 is implemented to determine whether the actuation amount of the actuator 26 is being increased or not. This determination is made based on a sign (indicative of positive or negative) of the rotational speed $V_M$ (that corresponds to a derivative value of the actual angular position $\theta$) and a sign (indicative of positive or negative) of the target angular position $\theta^*$. If the sign of the rotational speed $V_M$ and the sign of the target angular position $\theta^*$ coincide with each other, it is determined that the actuation amount of the actuator 26 is being increased, and the control flow goes to step S16 in which a command indicative of the target electric current amount $i^*$ is directed to the inverter 102. If the sign of rotational speed $V_M$ and the sign of the target angular position $\theta^*$ do not coincide with each other, it is determined that the actuation amount of the actuator 26 is not being increased, and the control flow goes to step S17 that is implemented to determine whether an absolute value of the distance-adjustment directed component $i^*_K$ is larger than a threshold $i_0$.

The determination in step S17 is carried out for determining which one of the reduction of the amount of the supplied electric power (that is to be made in the distance adjustment control) and the inhibition of the supply of the electric power (that is to be made in the damping-force control) is to be made. The above-described threshold $i_0$ corresponds to an amount of the electric current required to cause the adjuster device 20 to exhibit a minimum magnitude of the displacement force that is generated by rotation of the electric motor 70 by an angle detectable by the angular position sensor 84. That is, the threshold $i_0$ is a value that is considerably close to 0 (zero). Therefore, when the absolute value of the distance-adjustment directed component $i^*_K$ is not larger than the threshold $i_0$, the displacement force or the motor force directed to the distance adjustment control is not needed.

If an affirmative determination (YES) is obtained in step S17, the control flow goes to step S18 that is implemented to determine the reduced electric current amount $i_T$ by multiplying the target electric current amount $i^*$ by the positive/negative efficiency product $\eta_P \cdot \eta_N$. Step S18 is followed by step S19 in which a command indicative of the reduced electric current amount $i_T$ is directed to the inverter 102. On the other hand, if a negative determination (NO) is obtained in step S17, the control flow goes to step S20 that is implemented to determine whether an absolute value of the target angular position $\theta^*$ is larger than a first threshold $\theta_1$. If an affirmative determination (YES) is obtained in step S20, the control flow goes to step S21 in which a command requesting the electric motor 70 to be placed in the braking mode is directed to the inverter 102. If a negative determination (NO) is obtained in step S20, the control flow goes to step S22 in which the absolute value of the target angular position $\theta^*$ is smaller than a second threshold $\theta_2$ that is smaller than the first threshold $\theta_1$. If an affirmative determination (YES) is obtained in step S22, the control flow goes to step S23 in which a command requesting the electric motor 70 to be placed in the free mode is directed to the inverter 102. If a negative determination (NO) is obtained in step S22, the control flow goes to step S24 in which a command requesting the electric motor 70 to be placed in the standby mode is directed to the inverter 102. One cycle of execution of the adjuster-device controlling routine program of FIG. 12 is completed with step S21, S23 or S24.

[Construction of Controller]

The controller 104 of the present suspension system 10, which executes the above-described adjuster-device controlling routine program, can be considered to include functional portions as shown in FIG. 13, in view of the procedures in the execution of the controlling routine programs. Described specifically, the controller 106 includes: a target actuation amount determiner 150, as a functional portion assigned to implement steps S4, S6, S7, S9, S10, S12, which is operable to determine the target angular position $\theta^*$ as the target actuation amount of the actuator 26; a target electric current amount determiner 152, as a functional portion assigned to implement steps S11, S13, S14, which is operable to determine the target electric current amount $i^*$; an actuation amount increase/reduction determiner 154, as a functional portion assigned to implement step S15, which is operable to determine whether the actuation amount of the actuator 26 is being increased or reduced; a target-current-based motor controller 156, as a functional portion assigned to implement step S16, which is operable to control operation of the electric motor 70 based on the target electric current amount $i^*$; and a reduced-current-based motor controller 158, as a functional portion assigned to implement step S19, which is operable to control operation of the electric motor 70 based on the reduced electric current amount $i_T$ that is smaller than the target electric current amount $i^*$. The controller 104 further includes a power supply inhibitor 160, as a functional portion assigned to implement steps S20-S24, which is operable to inhibit supply of the electric power to the electric motor 70. The target electric current amount determiner 152 includes: a damping-force-directed component determiner 162, as a functional portion assigned to implement step S11, which is operable to the damping-force directed component $i^*_G$ and a distance-adjustment-directed component determiner 164, as a functional portion assigned to implement step S13, which is operable to the distance-adjustment directed component $i^*_K$. The power supply inhibitor 160 includes an operational mode establisher 166, as a functional portion assigned to implement steps S21-24, which is operable to establish the selected operational mode of the electric motor 70.

Figure 14:
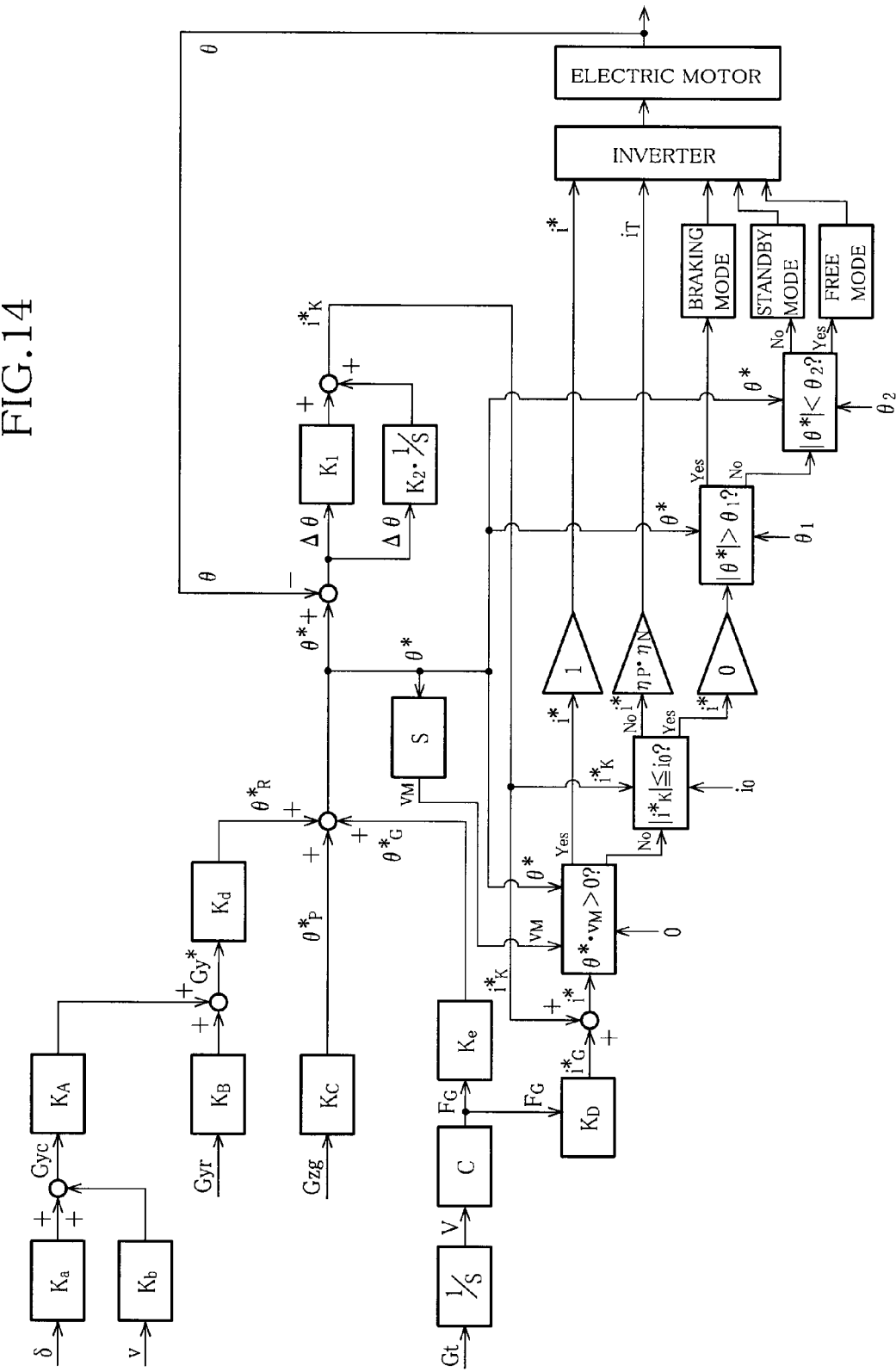
FIG. 14 is a control flow chart showing controls performed in the suspension system of FIG. 2.

FIG. 14 is a control flow chart showing the controls performed in the present suspension system 10. In the chart of FIG. 14, "Ka", "Kb", "Kd", "Ke" represents respective gains, "1/s" indicates an integral transfer function, and "s" indicates a differential transfer function.

What is claimed is:

1. A suspension system for a vehicle, comprising:
   (a) a suspension spring disposed between sprung and unsprung members of the vehicle;
   (b) a shock absorber disposed in parallel with said suspension spring; and
   (c) a displacement force generator disposed in parallel with said suspension spring and operable to generate a displacement force forcing the sprung and unsprung members to be displaced toward or away from each other, wherein said displacement force generator includes an elastic body connected at one of opposite end portions thereof to one of the sprung and unsprung members and an electrically-operated actuator disposed between the other of said opposite end portions of said elastic body and the other of the sprung and unsprung members and interconnecting said elastic body and the other of the sprung and unsprung members, and wherein said electrically-operated actuator includes an electric motor, and is operable to generate an actuator force based on a motor force generated by said electric motor, such that the generated actuator force acts on said elastic body so as to change an amount of deformation of said elastic body that is dependent on an amount of actuation of said actuator and such that the generated actuator force is transmitted to the sprung and unsprung members via said elastic body so as to act as the displacement force, said suspension system further comprising:

(d) a displacement force controller operable to control operation of said electric motor so as to control the displacement force that is to be generated by said displacement force generator, wherein said displacement force controller performs a damping-force control for controlling the displacement force as a damping force for damping vibration of at least one of the sprung and unsprung members, wherein said displacement force controller determines, based on a target magnitude of the displacement force that is to be generated by said displacement force generator, a target amount of an electric power that is to be supplied to said electric motor of said actuator of said displacement force generator, wherein said displacement force controller performs the damping-force control based on the determined target amount of the electric power, and wherein said displacement force controller performs the damping-force control, by allowing supply of the target amount of the electric power from an electric power source to said electric motor in a process of increasing a target actuation amount defined as an amount of actuation of said actuator that corresponds to the target magnitude of the displacement force, while inhibiting supply of the electric power from said electric power source to said electric motor in a process of reduction in the target actuation amount.

2. The suspension system according to claim 1, wherein said actuator is configured to have a positive/negative efficiency product that is not larger than 1/2, where the positive/negative efficiency product is defined as a product of a positive efficiency of said actuator and a negative efficiency of said actuator, the positive efficiency is defined as a ratio of a magnitude of an external force acting on said actuator, to a magnitude of the motor force minimally required to cause the actuation of said actuator against the external force, and the negative efficiency is defined as a ratio of a magnitude of the motor force minimally required to inhibit said actuator from being actuated by an external force acting on said actuator, to a magnitude of the external force.

3. The suspension system according to claim 1, wherein said shock absorber is configured to have a damping coefficient that establishes a vibration damping characteristic suitable for damping vibration of a frequency range including a resonance frequency of the unsprung member.

4. The suspension system according to claim 1, wherein the damping-force control is performed for generating the displacement force as the damping force whose magnitude is dependent on an absolute velocity of the sprung member.

5. The suspension system according to claim 1, further comprising a drive circuit configured to drive said electric motor, wherein said displacement force controller performs the damping-force control, by causing said electric motor, in the process of reduction in the target actuation amount, to be operated under an operational mode which is dependent on an operational state of said drive circuit, and wherein the operational mode is one of (A) a motor-terminals interconnecting mode in which a plurality of motor terminals of said electric motor are electrically connected to each other, (B) a specific-motor-terminal/power-supply-terminal connecting mode in which one of a high-level voltage terminal and a low-level voltage terminal of said power source is electrically connected to a selected one of said plurality of motor terminals of said electric motor that is changed depending on an operating position of said electric motor, and (C) a motor-terminals disconnecting mode in which neither said high-level voltage terminal nor said low-level voltage terminal of said power source is electrically connected to said plurality of motor terminals of said electric motor and in which said plurality of motor terminals are electrically disconnected from each other.

6. The suspension system according to claim 1, wherein said displacement force controller performs, concurrently with performance of the damping-force control, a distance adjustment control for controlling the displacement force so as to adjust a distance between the sprung and unsprung members.

7. The suspension system according to claim 6, wherein said displacement force controller determines a damping-force-directed component, based on a magnitude of the displacement force that is to be generated in performance of the damping-force control, wherein said displacement force controller determines a distance-adjustment-directed component, based on a deviation of an actual amount of actuation of said actuator from a target amount of actuation of said actuator, such that the determined distance-adjustment-directed component includes a first component based on the deviation and a second component based on an integral value of the deviation, and wherein the damping-force control and the distance adjustment control are performed by said displacement force controller, concurrently with each other, based on a sum of the determined damping-force-directed and distance-adjustment-directed components that is a target amount of an electric power that is to be supplied to said electric motor, where the damping-force-directed component is defined as a component of the target amount of the electric power that is directed to performance of the damping-force control, while the distance-adjustment-directed component is defined as a component of the target amount of the electric power that is directed to performance of the distance adjustment control, and the target amount of actuation of said actuator is defined as a sum of (i) a damping-force-correspondent component corresponding to a magnitude of the displacement force that is to be generated in performance of the damping-force control and (ii) a distance-adjustment-correspondent component corresponding to a distance between the sprung and unsprung members that is to be established in performance of the distance adjustment control.

8. The suspension system according to claim 7, wherein said displacement force controller performs the damping-force control and the distance adjustment control concurrently with each other, by allowing supply of the target amount of the electric power from an electric power source to said electric motor in process of increase in the target amount of actuation of said actuator, while allowing supply of a reduced amount of the electric power that is smaller than the target amount of the electric power, in process of reduction in the target amount of actuation of said actuator.

9. The suspension system according to claim 8, wherein the reduced amount of the electric power is equal to the target amount of the electric power multiplied by a positive/negative efficiency product, where the positive/negative efficiency product is defined as a product of a positive efficiency of said actuator and a negative efficiency of said actuator, the positive efficiency is defined as a ratio of a magnitude of an external force acting on said actuator, to a magnitude of the motor force minimally required to cause the actuation of said actuator against the external force, and the negative efficiency is defined as a ratio of a magnitude of the motor force minimally required to inhibit said actuator from being actuated by an external force acting on said actuator, to a magnitude of the external force.

* * * * *